Figure 12:
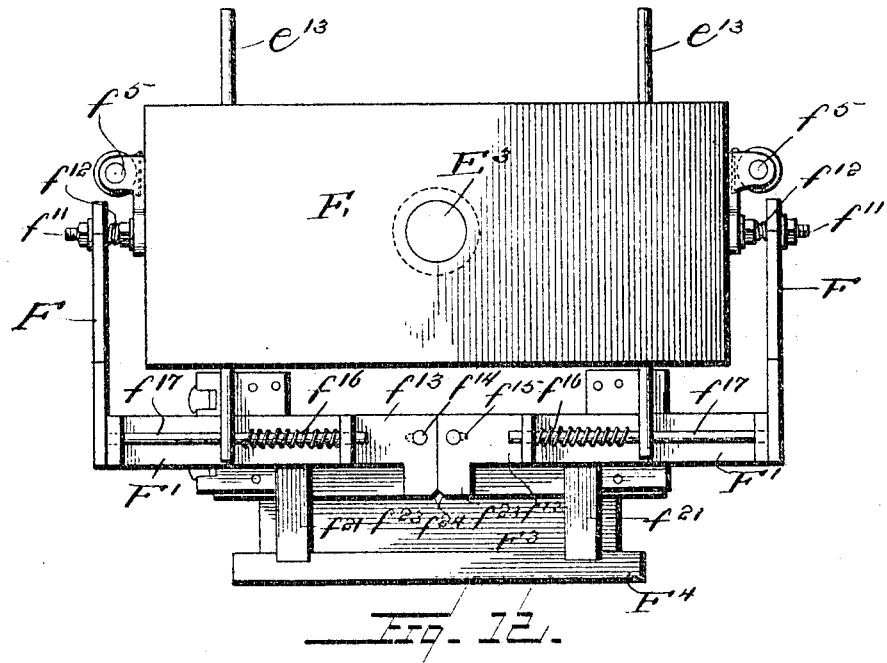

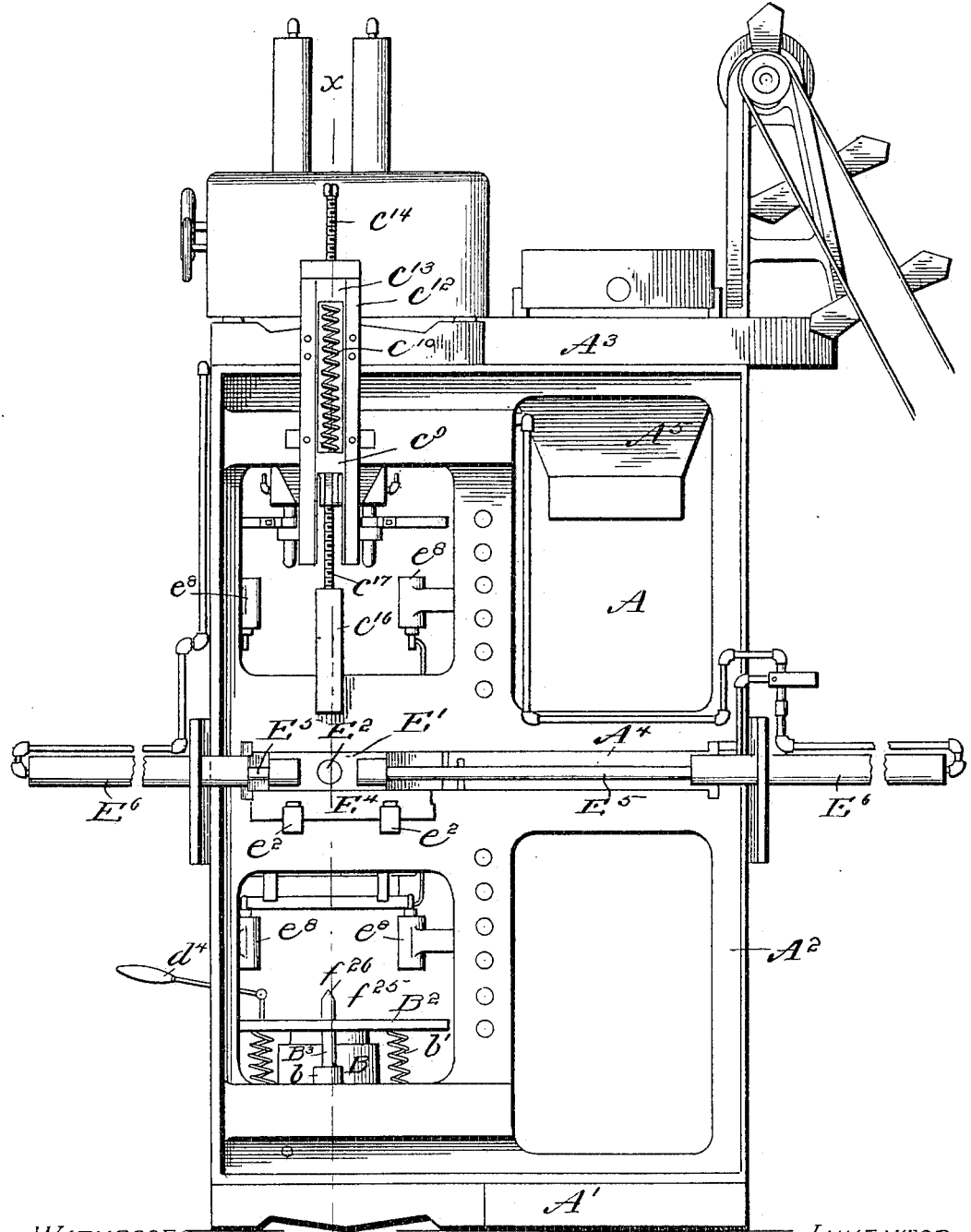

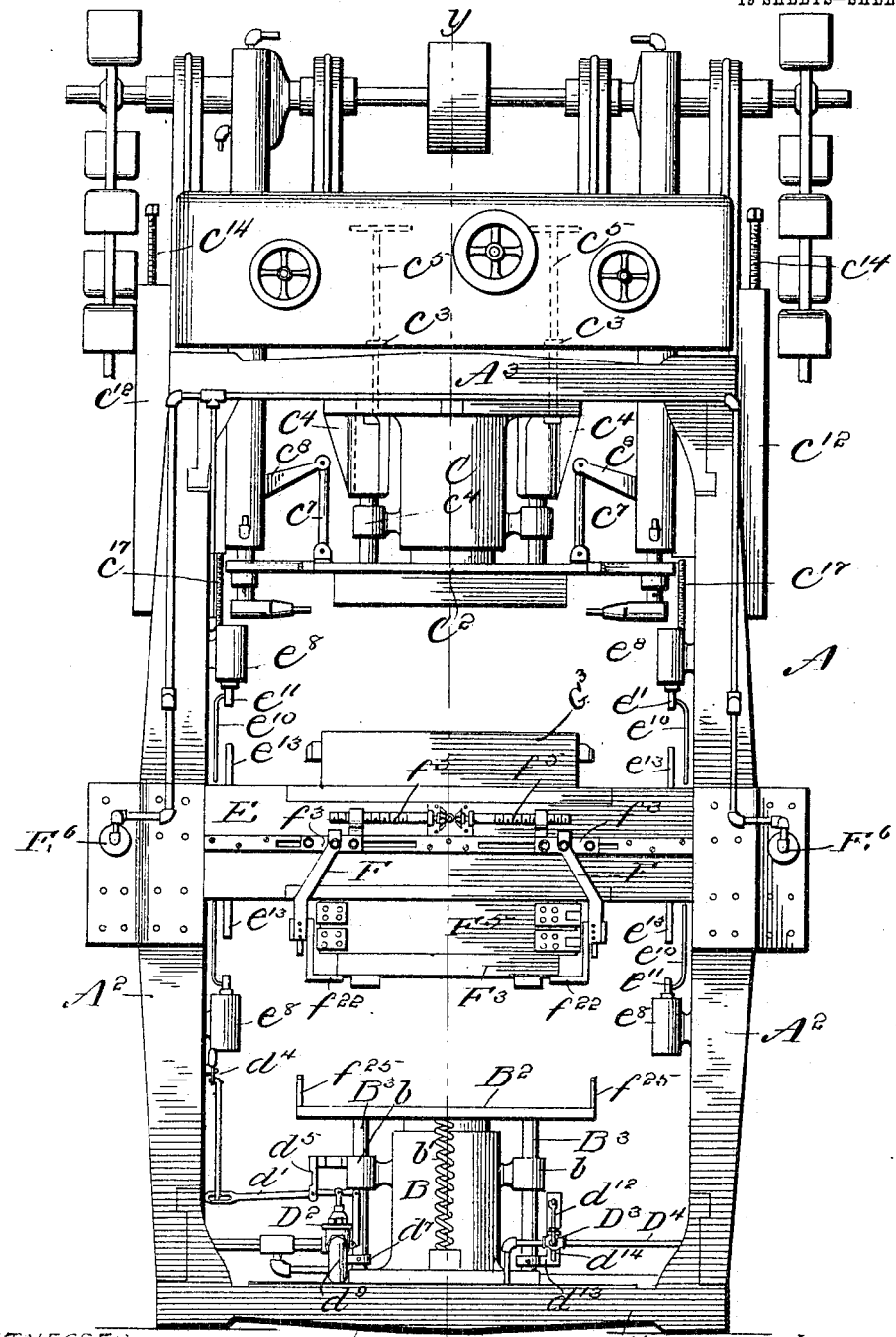

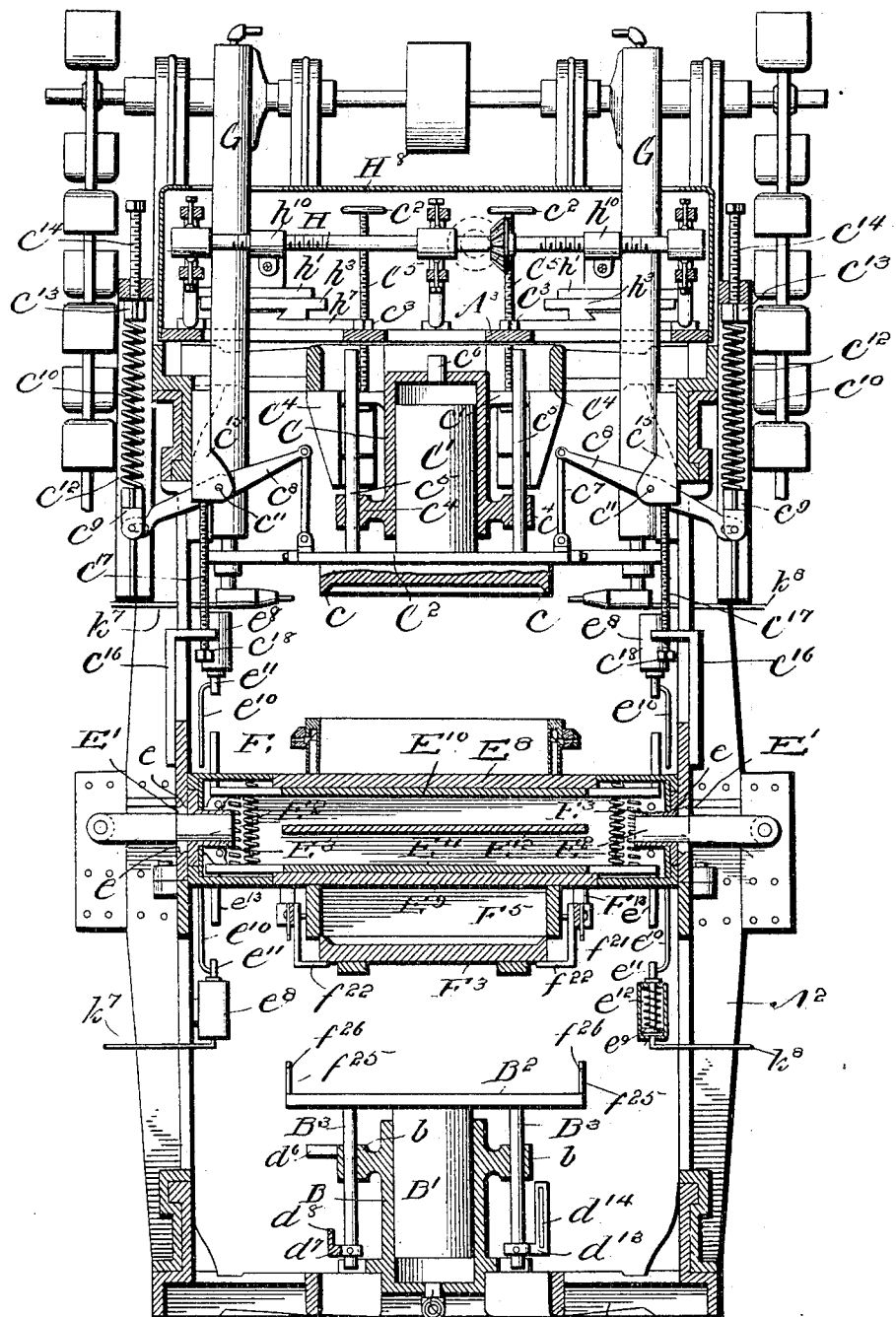

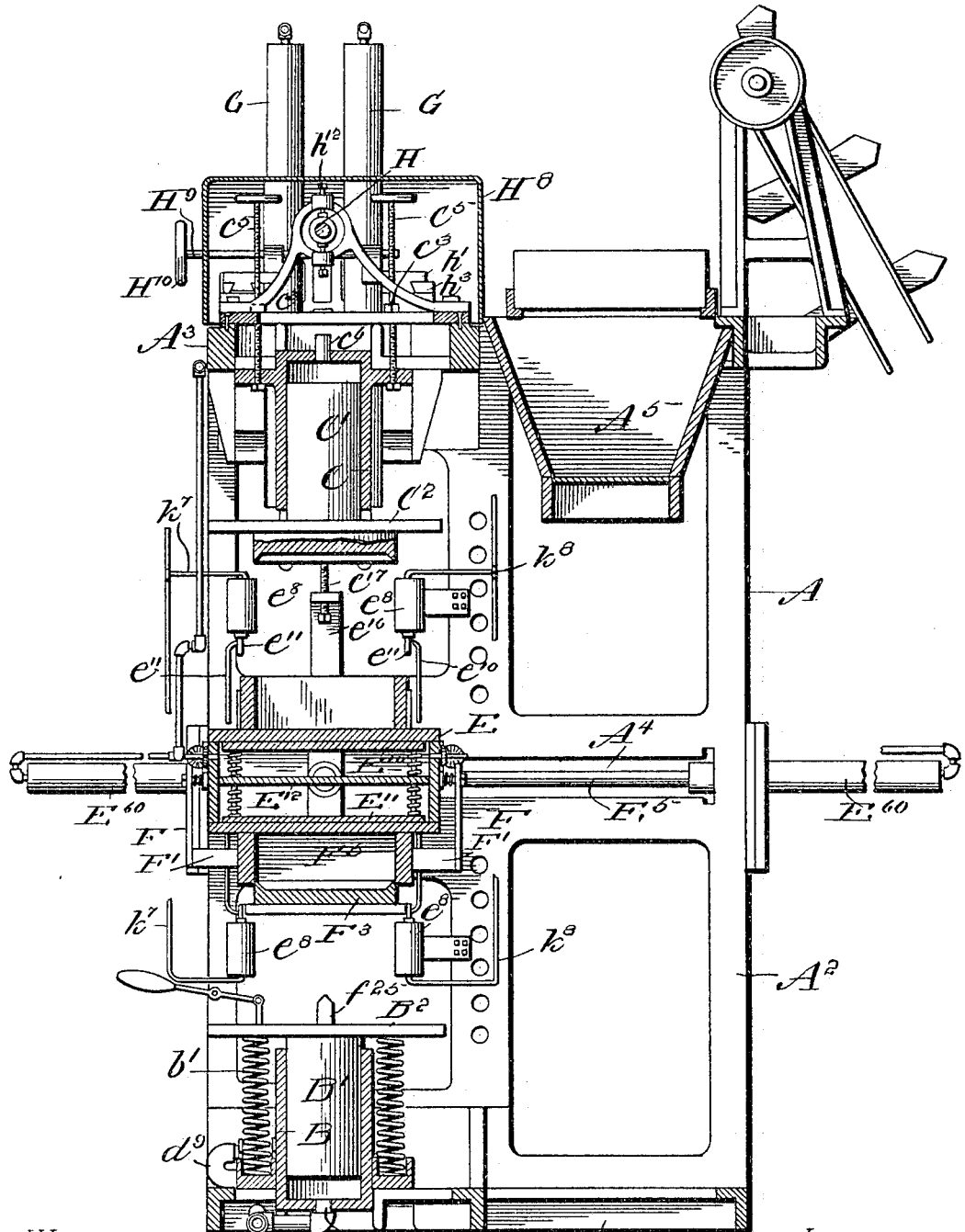

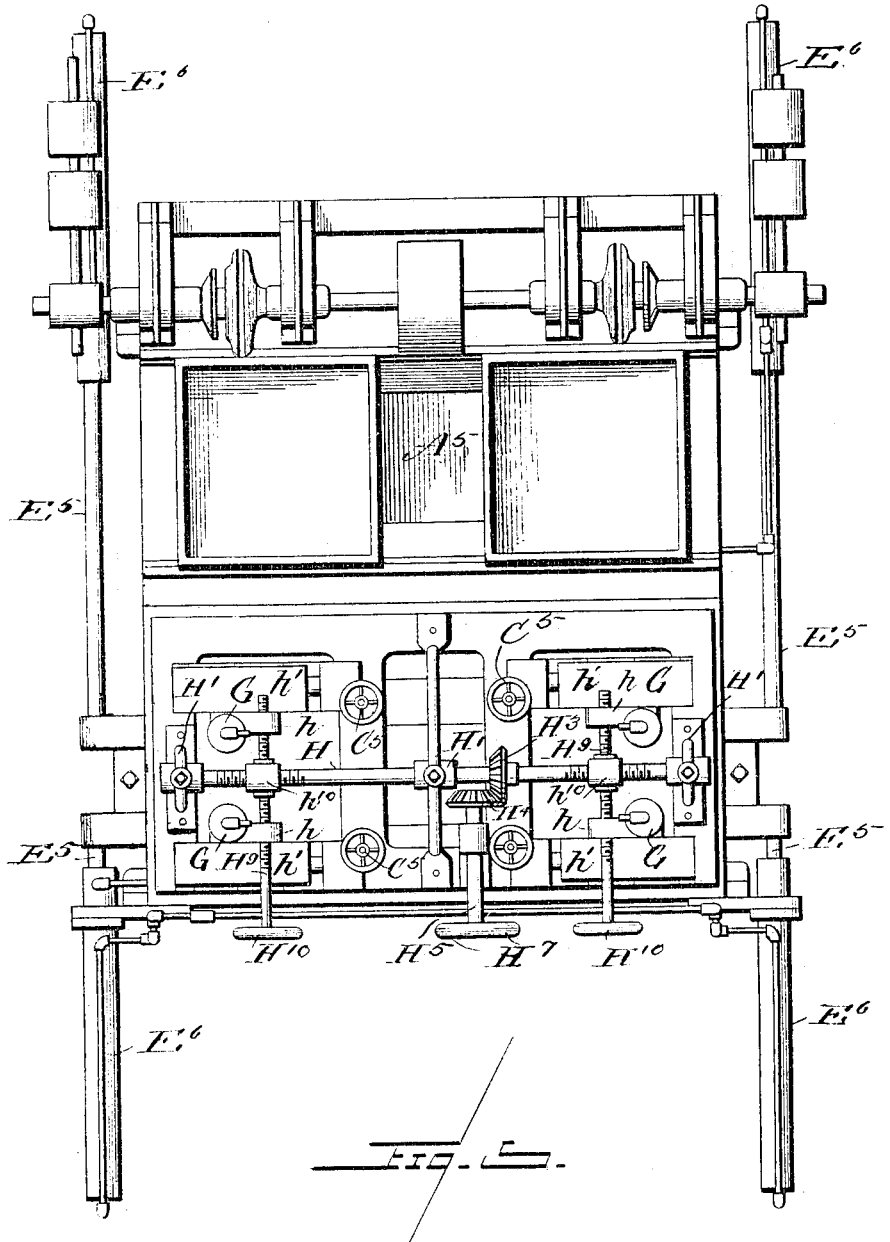

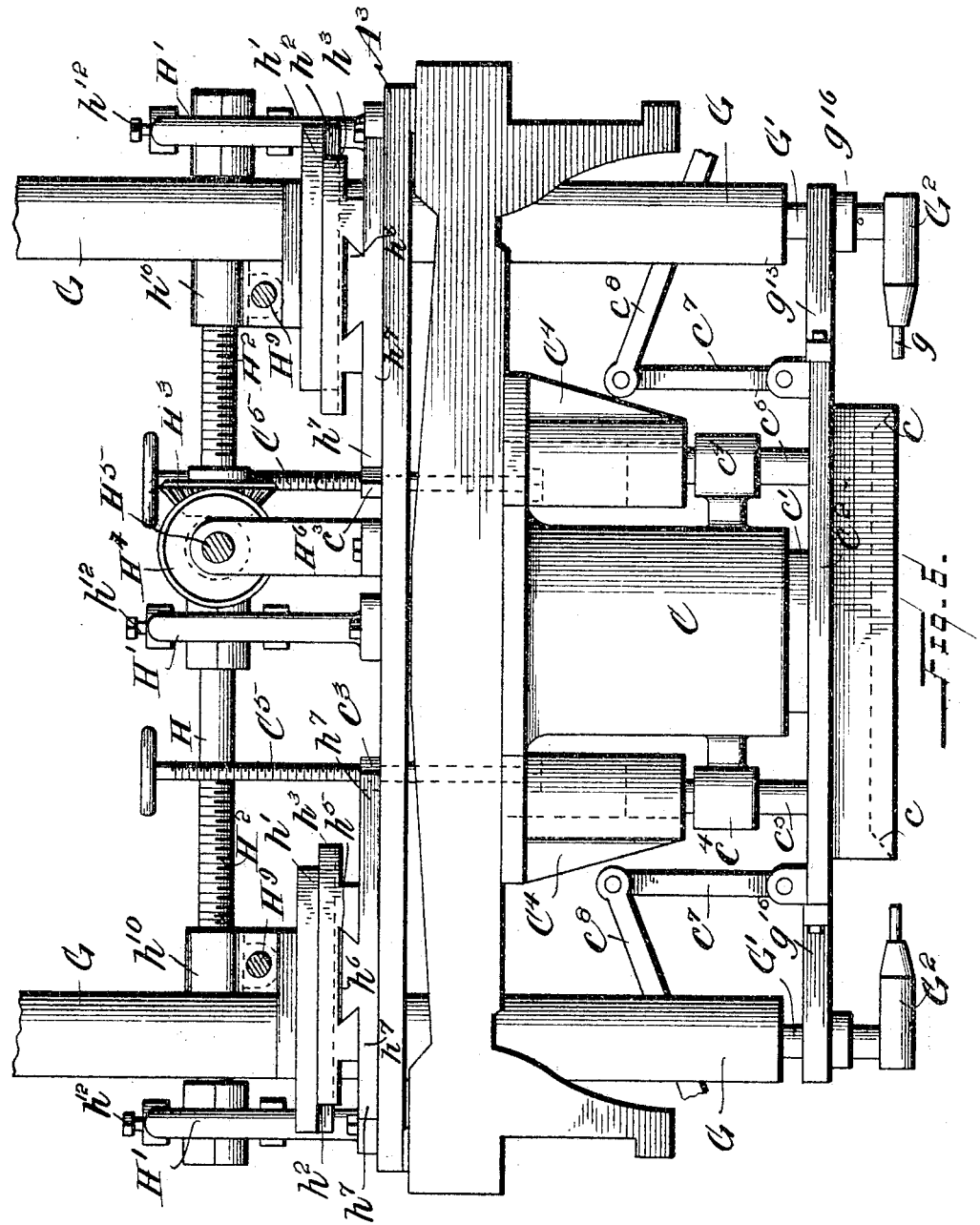

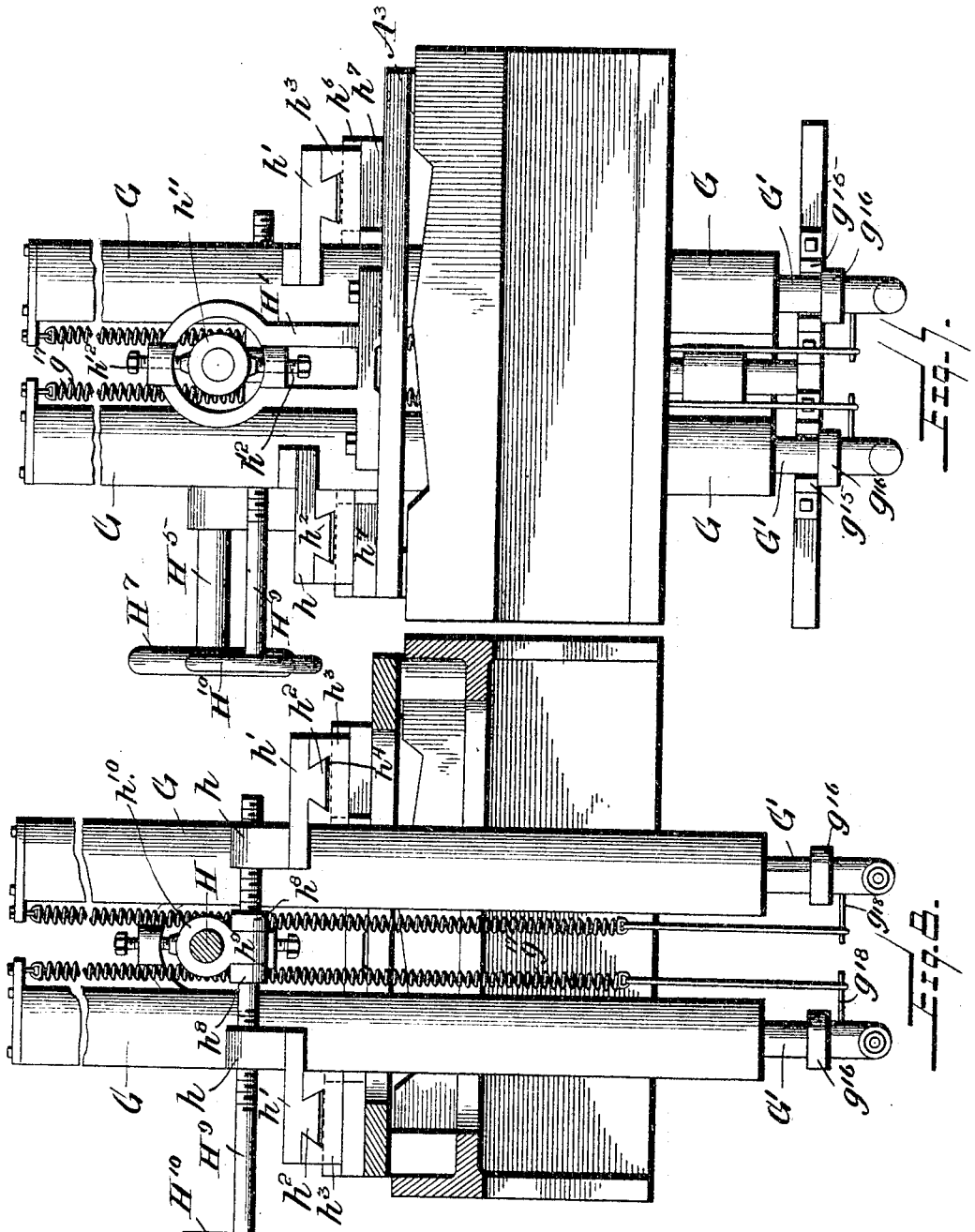

No. 798,675. PATENTED SEPT. 5, 1905.
F. W. HALL.
MOLDING MACHINE.
APPLICATION FILED SEPT. 30, 1903.
19 SHEETS—SHEET 8.
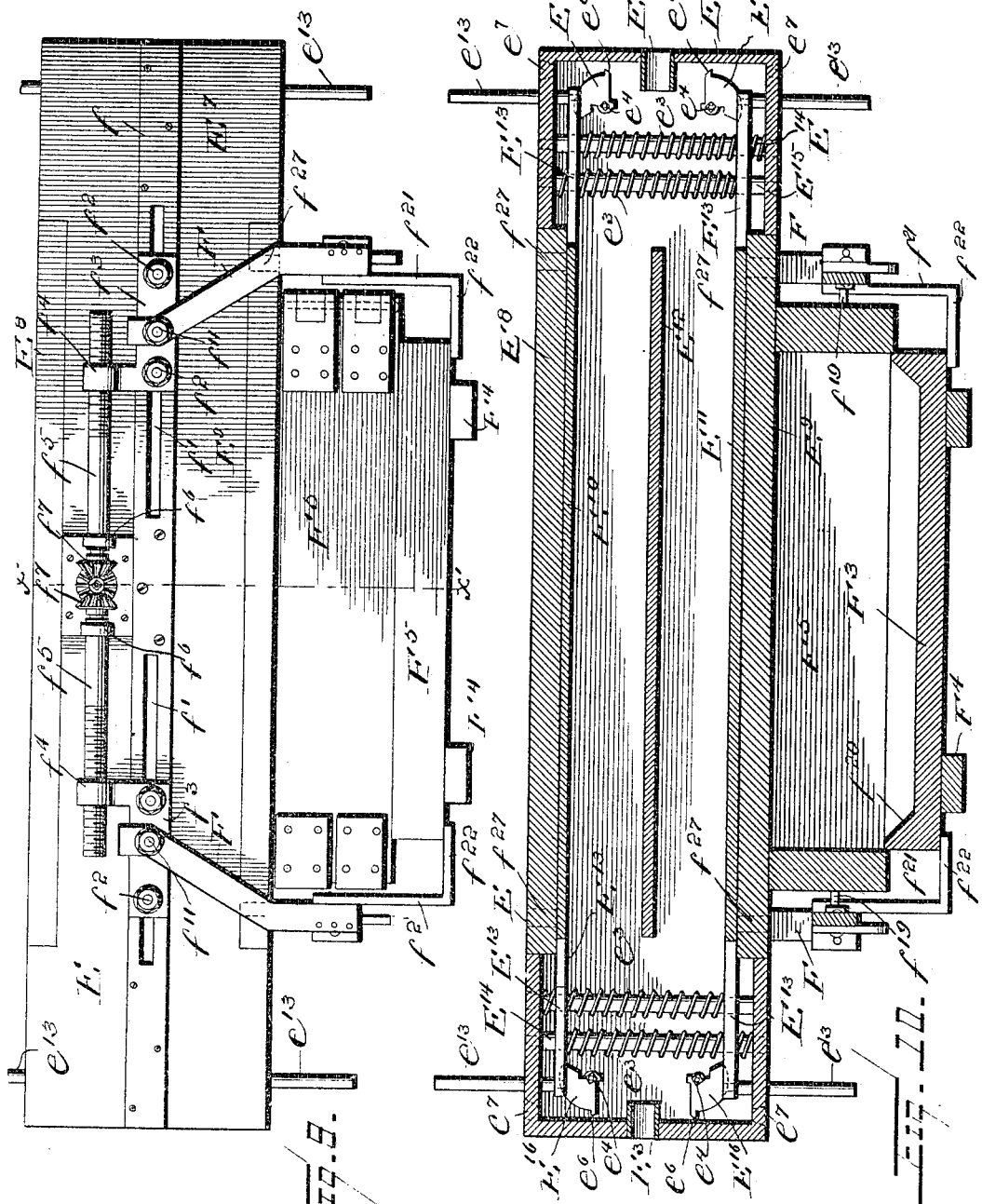
WITNESSES:
W. F. Doyle.
A. Harrycutter.
INVENTOR
Frederick W. Hall.
BY
Attorney

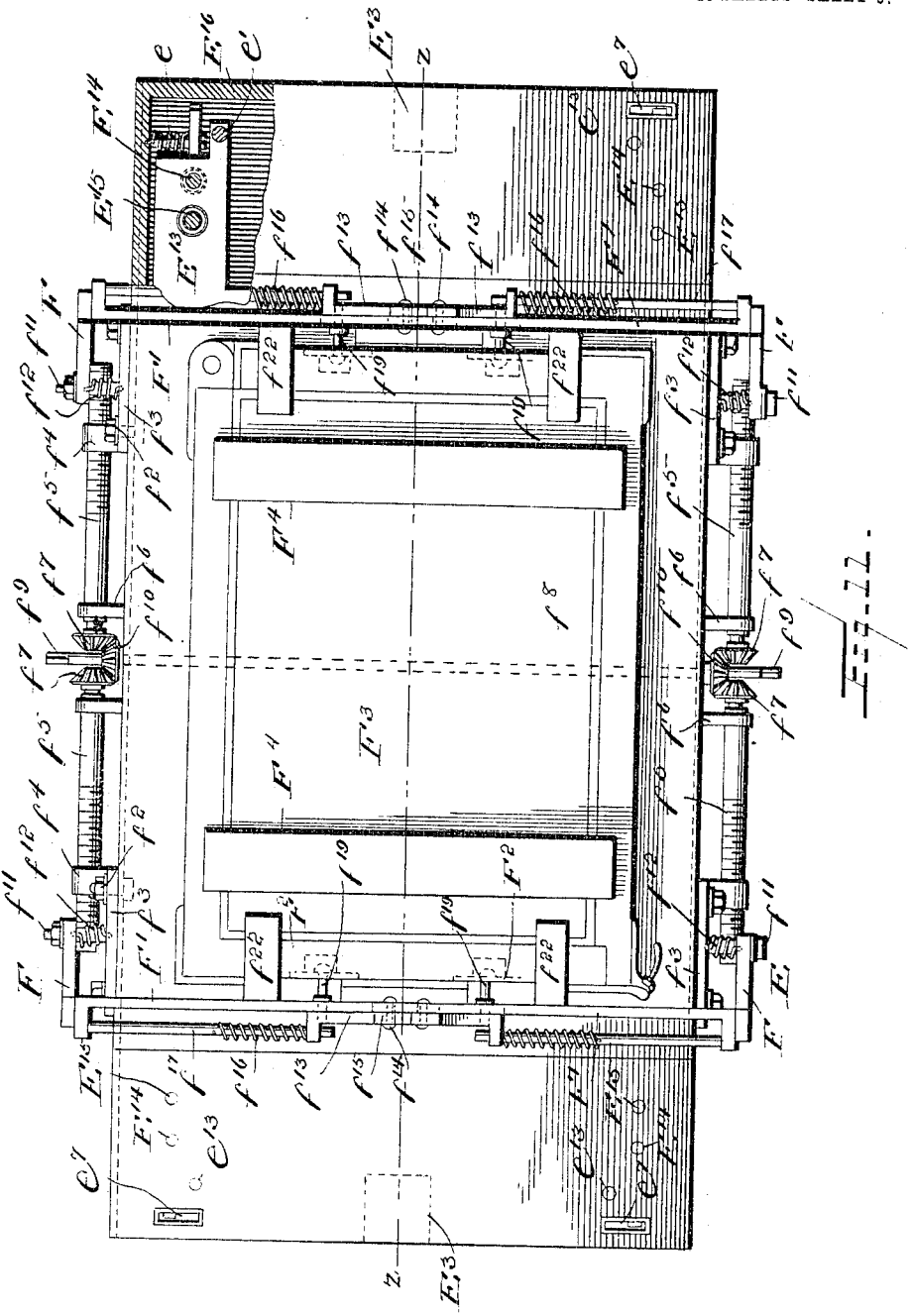

No. 798,675. PATENTED SEPT. 5, 1905.
F. W. HALL.
MOLDING MACHINE.
APPLICATION FILED SEPT. 30, 1903.

19 SHEETS—SHEET 10.

WITNESSES:
Wm. F. Doyle.
A. Harveycutter.

INVENTOR
Frederick W. Hall,
BY H. V. Hinton
Attorney

No. 798,675. PATENTED SEPT. 5, 1905.
F. W. HALL.
MOLDING MACHINE.
APPLICATION FILED SEPT. 30, 1903.
19 SHEETS—SHEET 11.

WITNESSES
INVENTOR
Frederick W. Hall
Attorney

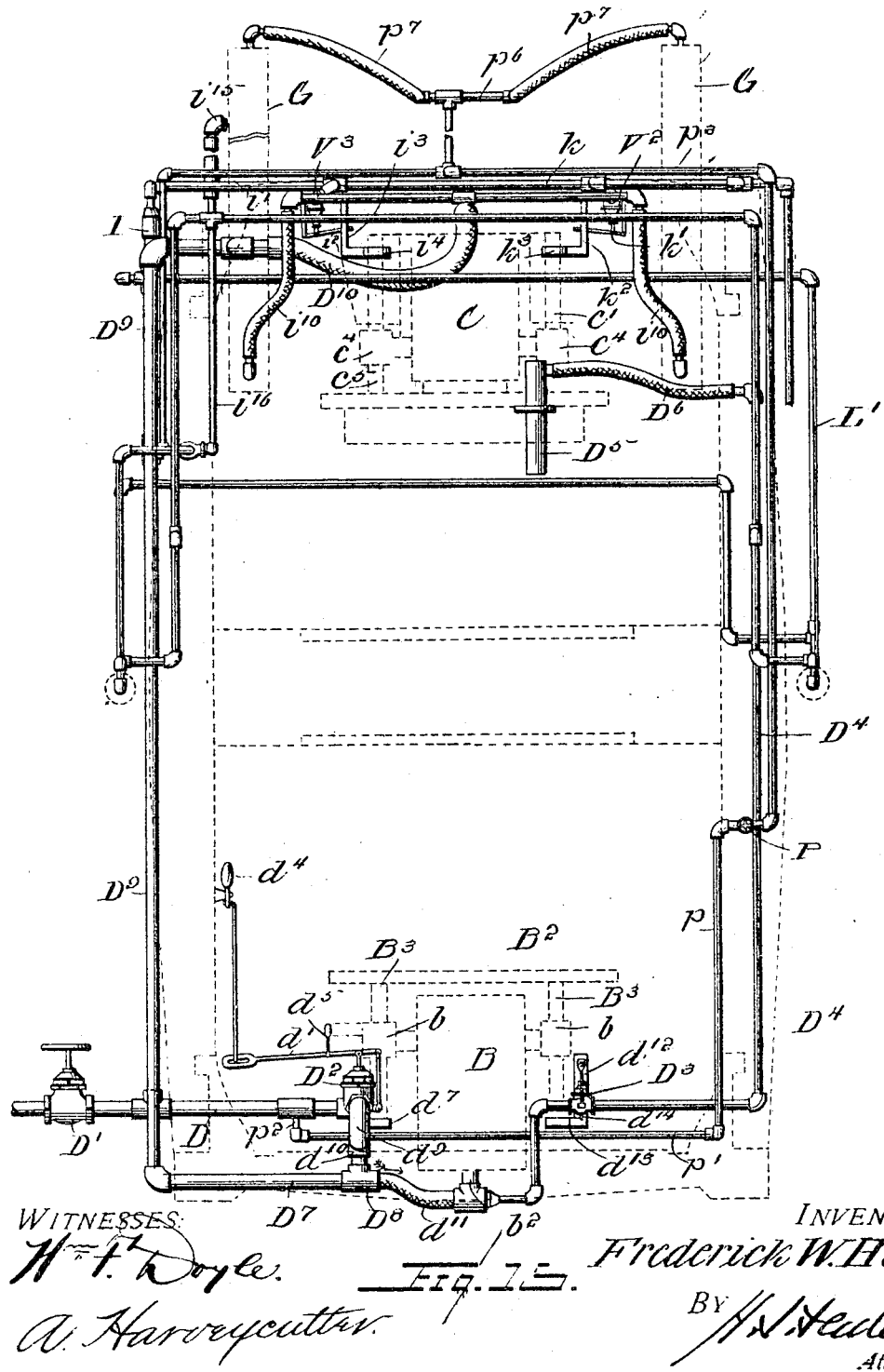

No. 798,675. PATENTED SEPT. 5, 1905.
F. W. HALL.
MOLDING MACHINE.
APPLICATION FILED SEPT. 30, 1903.

19 SHEETS—SHEET 13.

WITNESSES:

INVENTOR
Frederick W. Hall
By H. H. Henton
Attorney

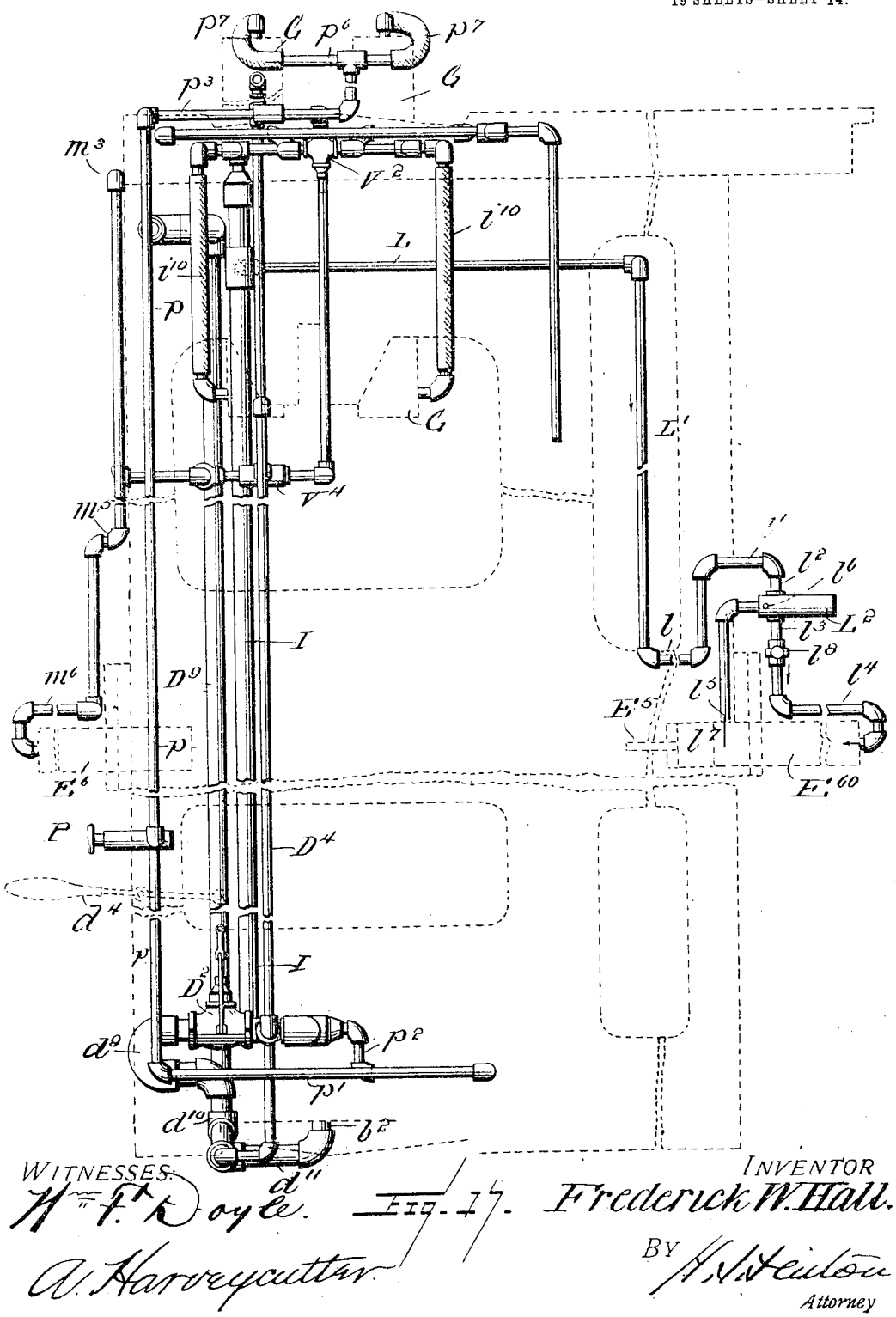

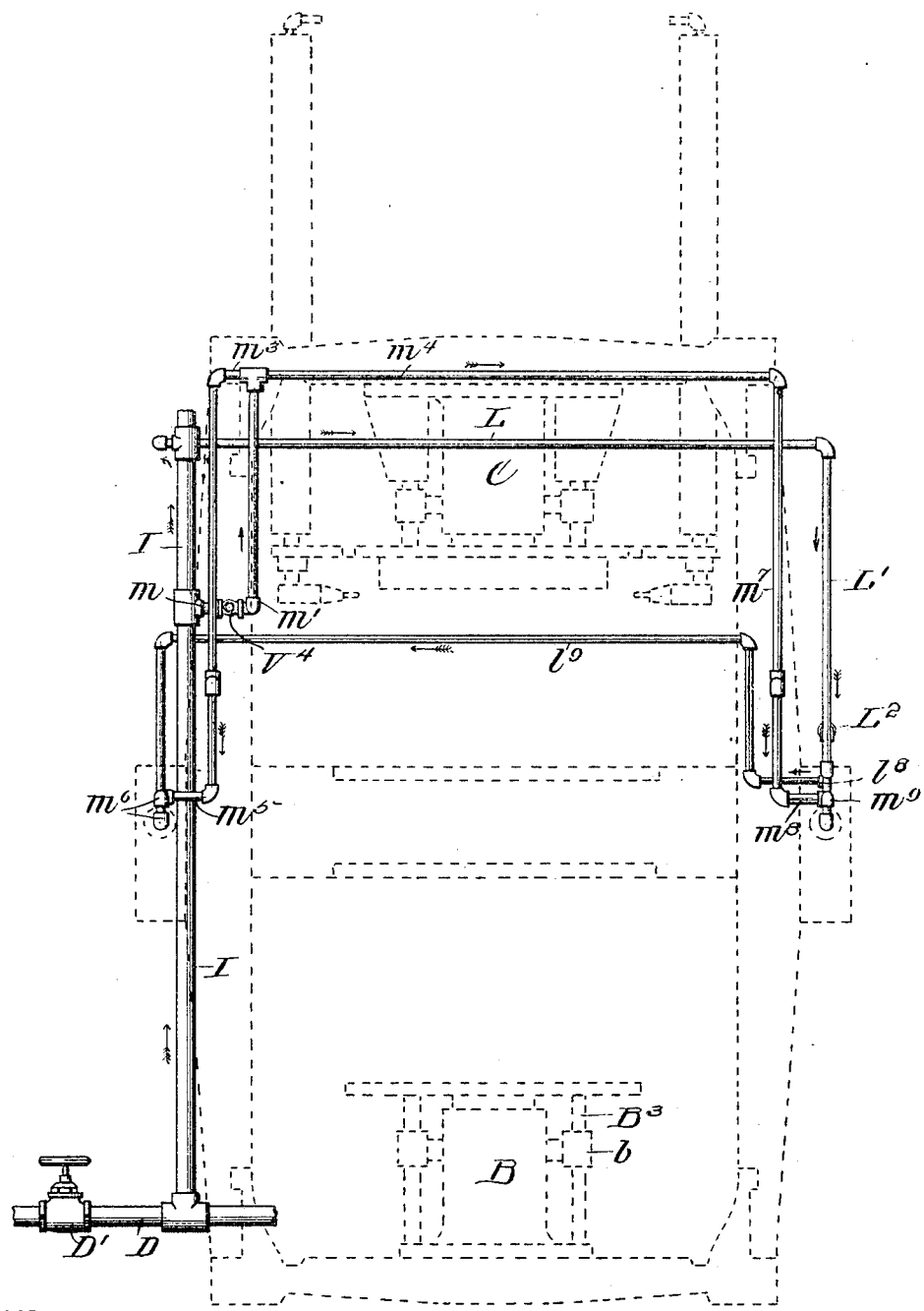

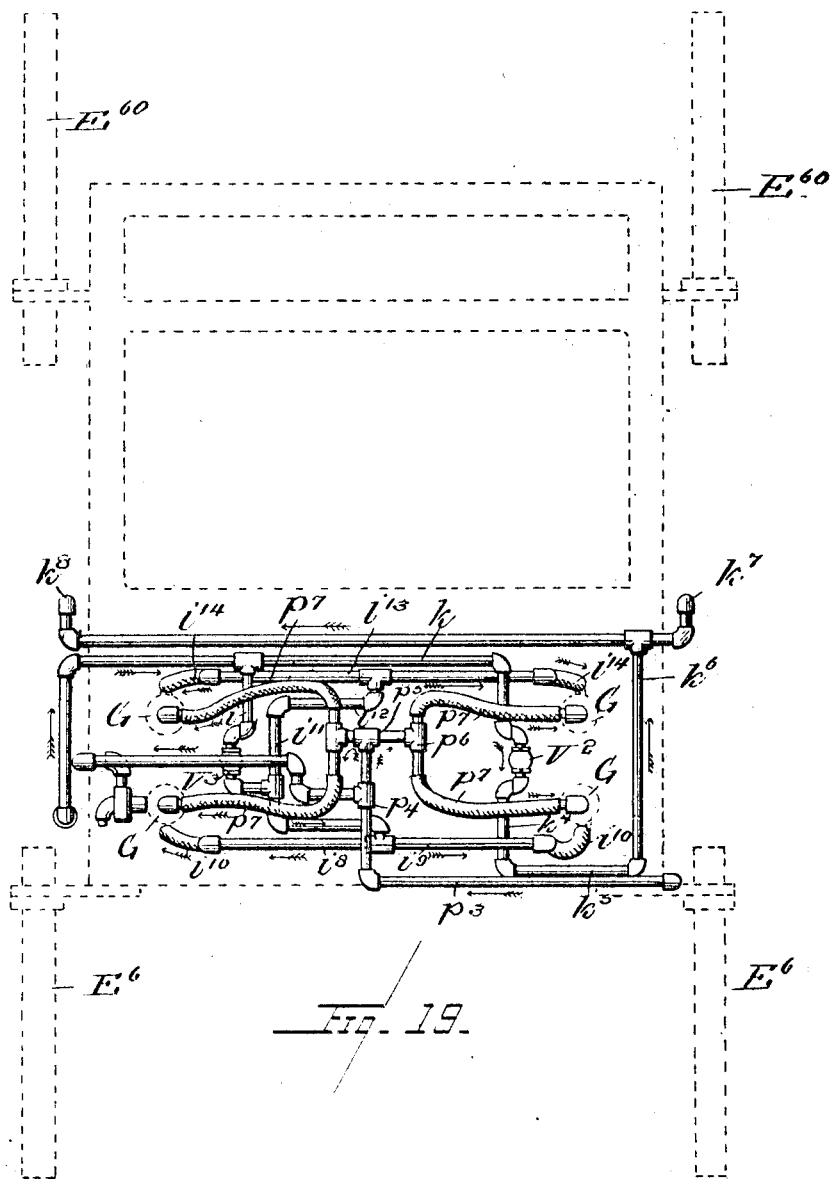

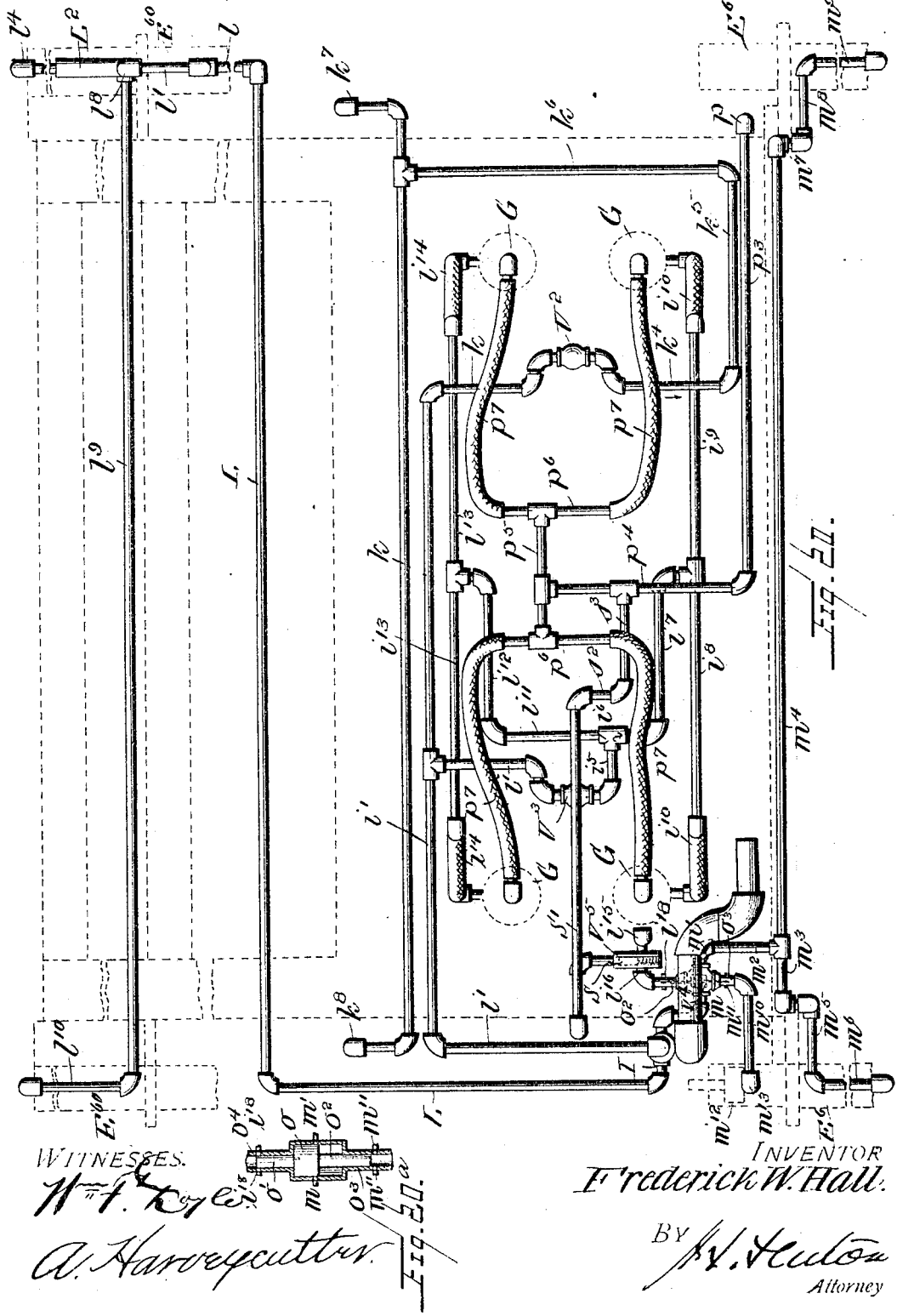

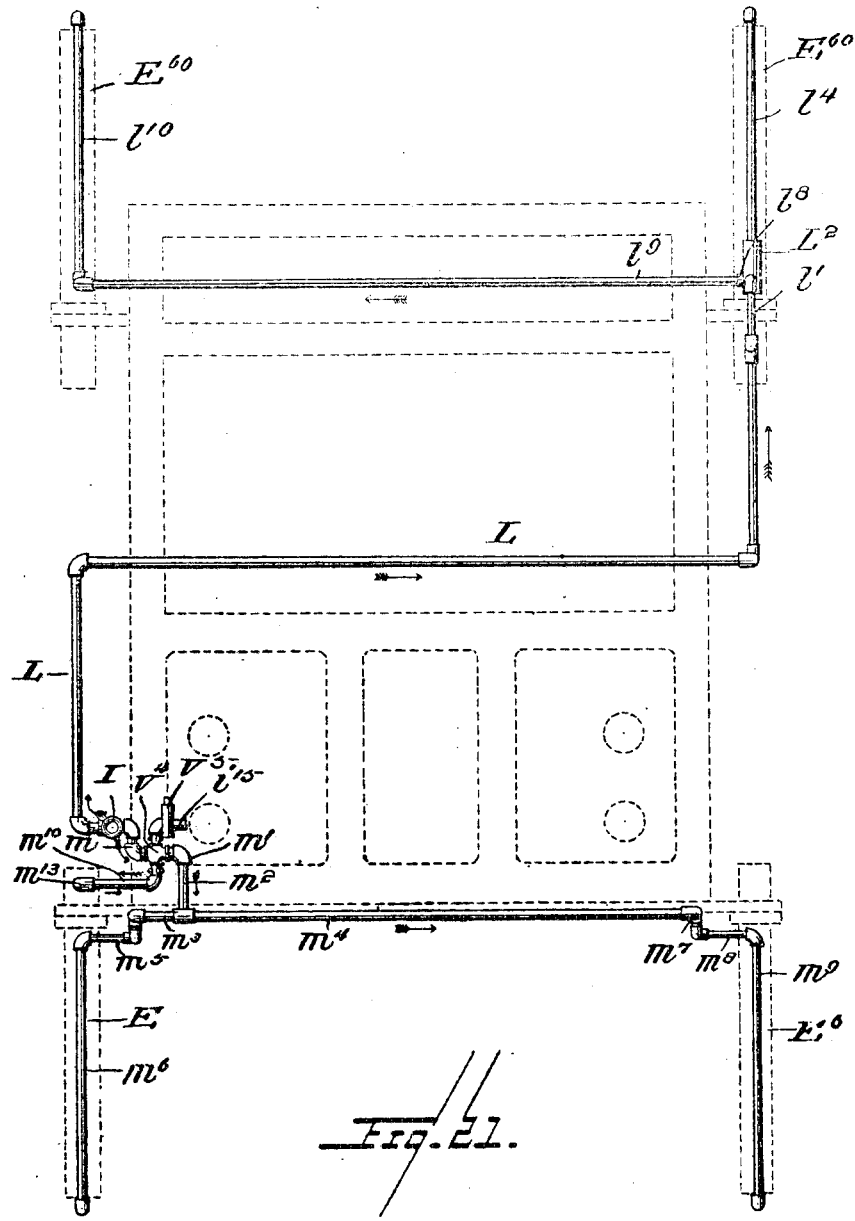

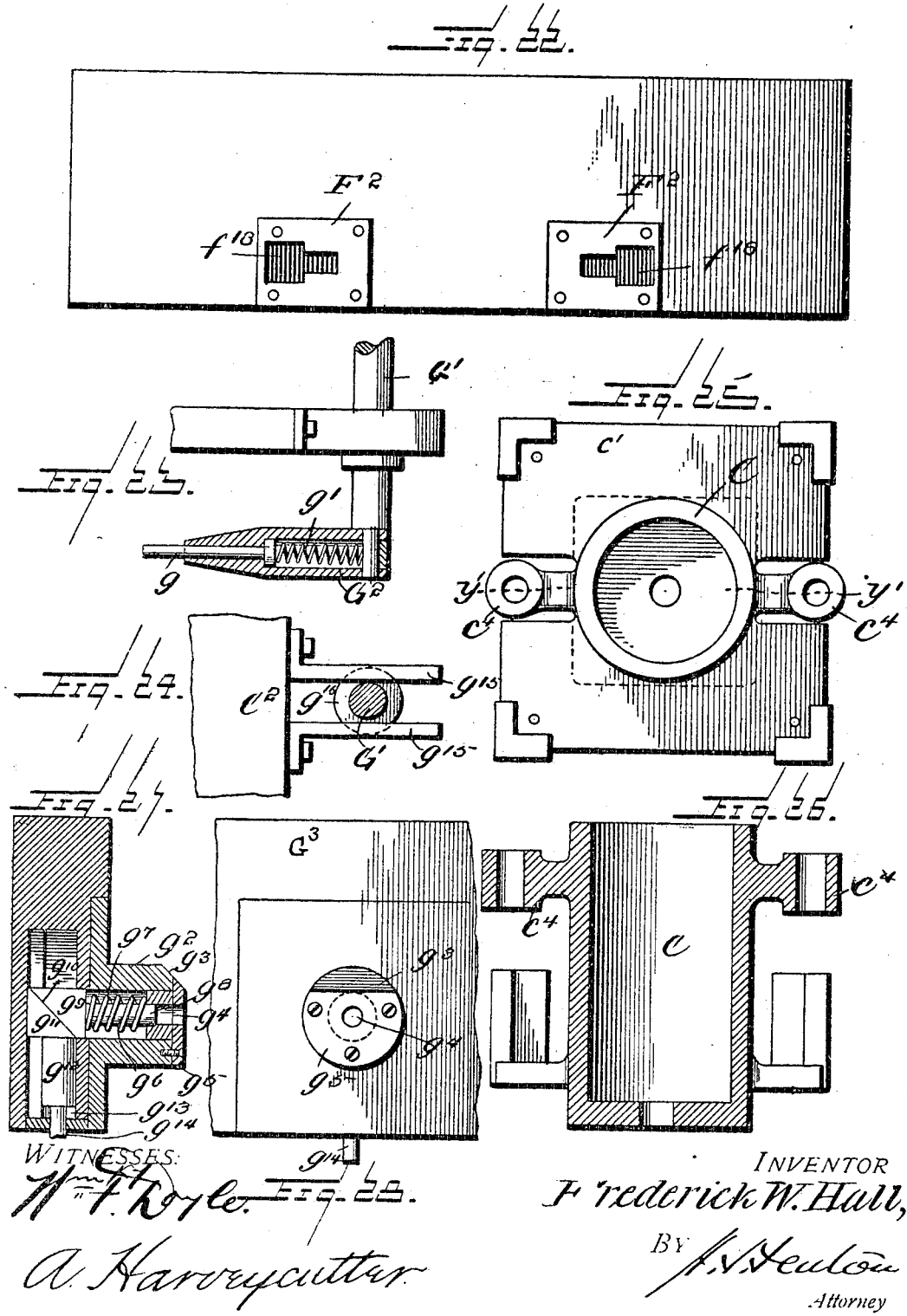

UNITED STATES PATENT OFFICE.

FREDERICK W. HALL, OF CAMDEN, NEW JERSEY, ASSIGNOR OF ONE-HALF TO J. W. PAXSON COMPANY, OF PHILADELPHIA, PENNSYLVANIA, A CORPORATION OF PENNSYLVANIA.

MOLDING-MACHINE.

No. 798,675. Specification of Letters Patent. Registered Sept. 5, 1905.

Application filed September 30, 1903. Serial No. 175,127.

*To all whom it may concern:*

Be it known that I, FREDERICK W. HALL, a citizen of the United States, residing at Camden, in the State of New Jersey, have invented certain new and useful Improvements in Molding-Machines, of which the following is a full, clear, and exact description, reference being had to the accompanying drawings, forming a part of this specification.

The invention to be hereinafter described relates to molding-machines for expeditiously performing the operations incident to the making of molds and assembling the drag and cope sections in the completion of the flask.

The objects of the present invention, generally stated, are to provide a fully-organized molding-machine of the character referred to wherein the various operations—such as ramming the sand about the patterns, the handling and assembling of the drag and cope sections to complete the flask, the withdrawal of the patterns after the ramming operation, and the movement of the table to position between the ramming devices and to one side for recharging the cope and drag with sand—shall be automatically accomplished as far as possible with the least attention on the part of the operatives, so that the molds may be readily and expeditiously formed with accuracy.

Other generally-stated objects are to provide simplified mechanically-constructed parts adapted for great variety of work and to render the different elements of the structure adjustable to different sizes of molds to be formed, thus imparting to the organized machine a wide range of utility, and to operate the movable parts in the formation of a mold by means of air or other fluid pressure, operation of one part putting into action air or fluid pressure to accomplish the succeeding operation of the next part in the cycle of a mold formation.

Other objects as to the structure of the machine and its function will appear more fully hereinafter.

With these generally-stated objects in view the invention consists of the parts and combinations, as will be hereinafter more fully described in detail and then definitely pointed out in the claims.

Figure 13:
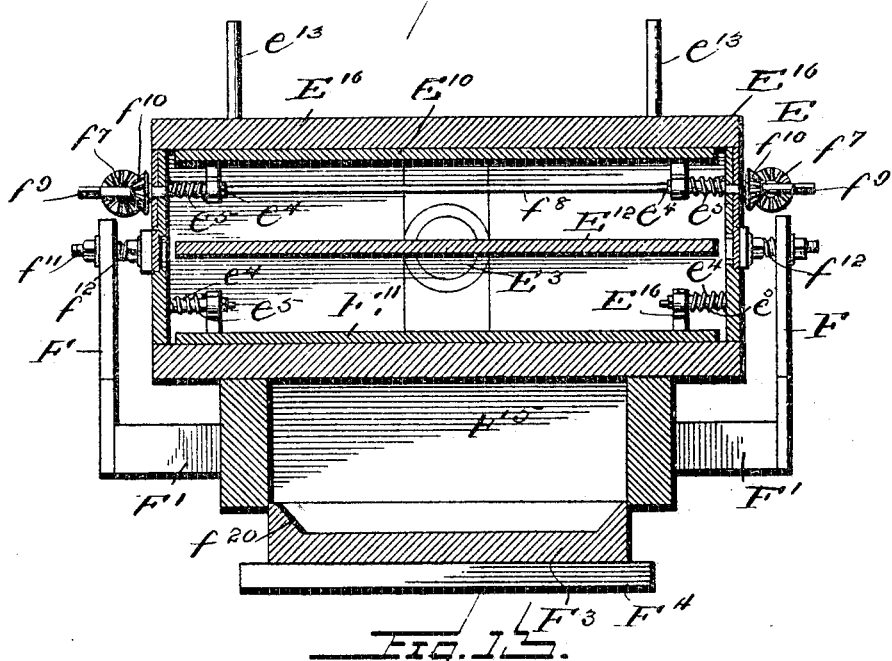
Figure 24:
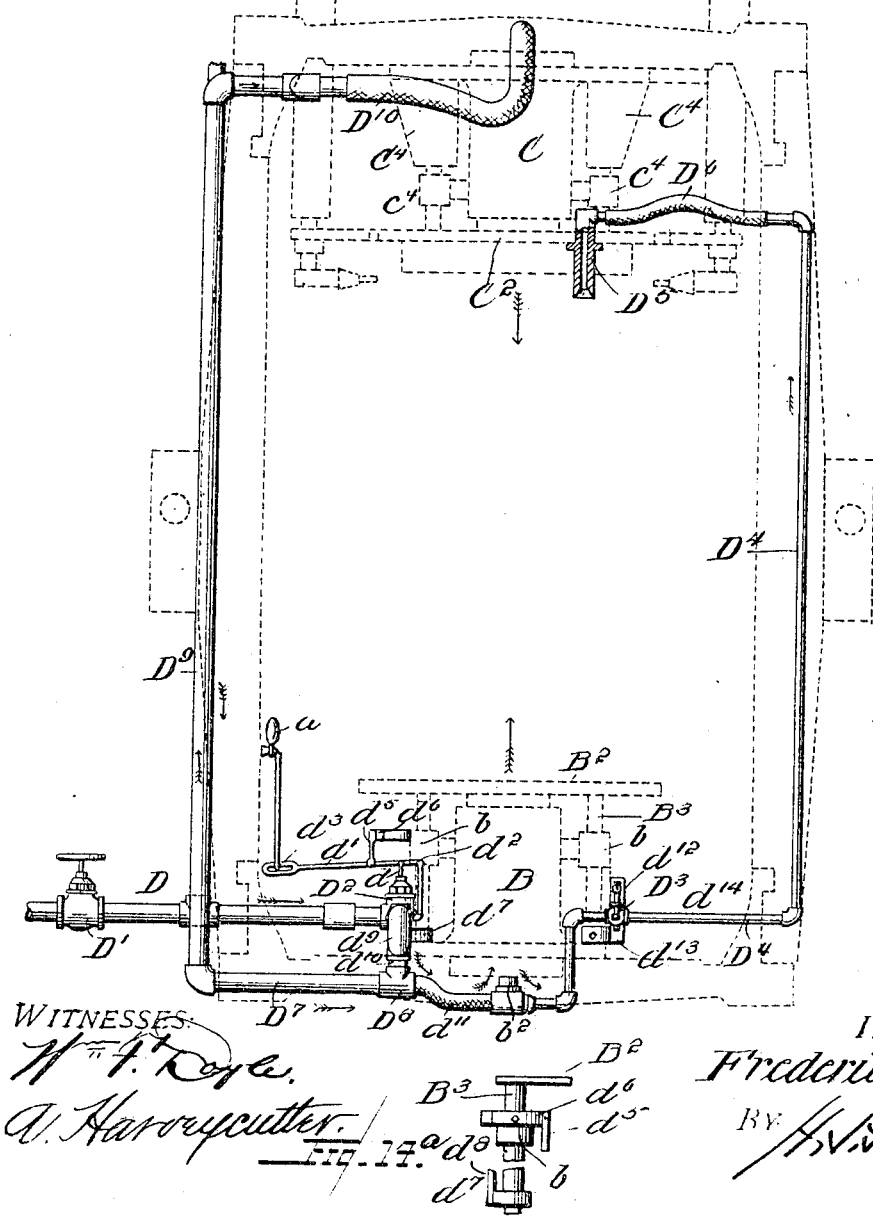
Figure 16:
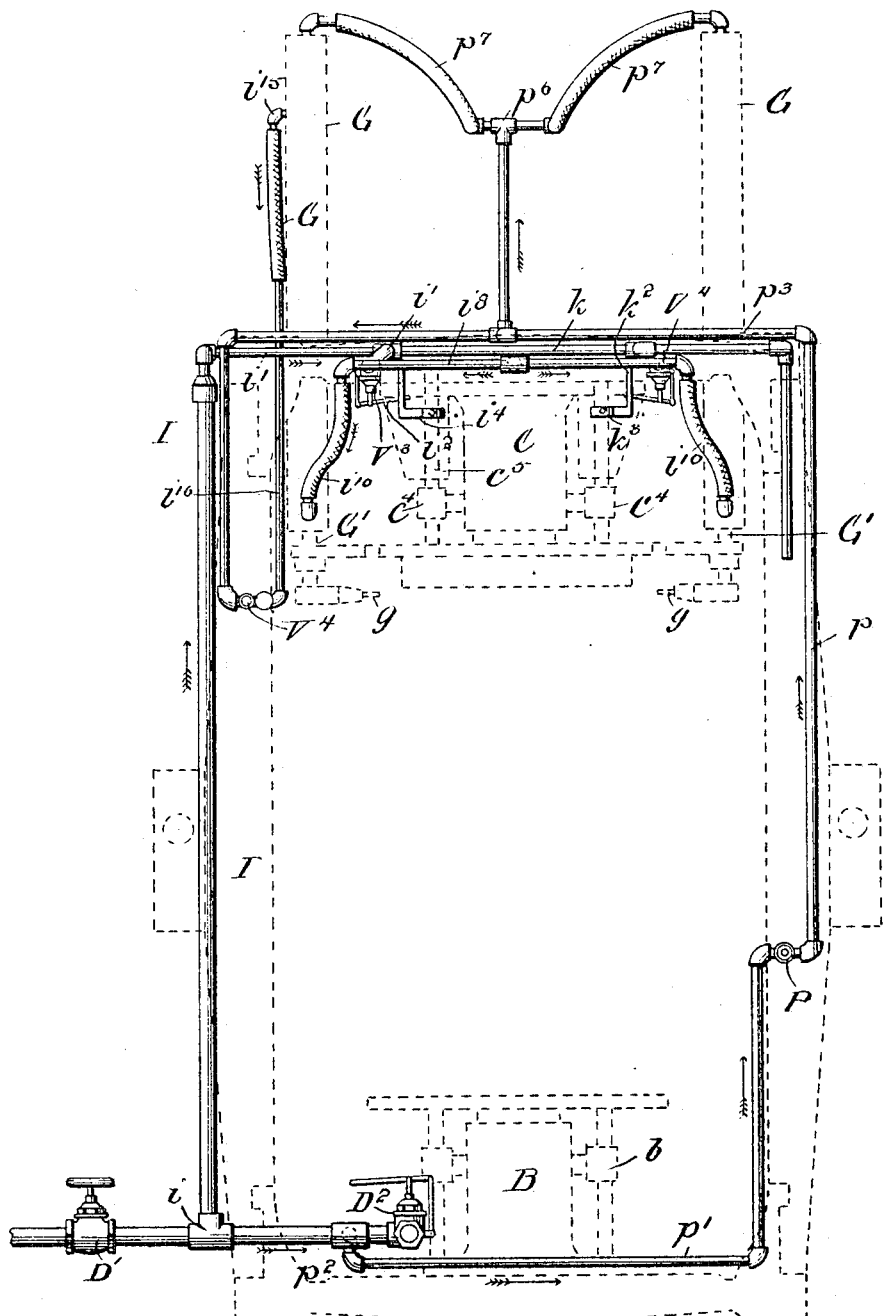

In the drawings, Figure 1 is a side elevation of a molding-machine embodying the present invention in one of its preferred forms with some of the piping connections omitted for the sake of clearness. Fig. 2 is a front elevation thereof. Fig. 3 is a longitudinal section thereof on line $x\ x$, Fig. 1, some of the parts being shown in elevation to more clearly illustrate the structural relation of parts. Fig. 4 is a transverse section of the machine on line $y\ y$, Fig. 2, parts being also shown in elevation for the purpose of clearness of details. Fig. 5 is a top plan view, some of the piping connections being omitted for the purpose of clear illustration of structure. Fig. 6 is an enlarged detail front elevation of the top portion of the machine with piping and cover omitted, showing the flask-assembling mechanism and its adjusting means. Fig. 7 is an enlarged detail end elevation of the parts shown by Fig. 6, showing the adjustable character of the flask-assembling mechanism. Fig. 8 is an enlarged sectional detail of the same. Fig. 9 is an enlarged detail front view of the table detached from the machine and showing the drag-section of the flask sustained thereby. Fig. 10 is a detail longitudinal sectional view of the table and the attached drag-section, taken on line $z\ z$ of Fig. 11. Fig. 11 is a bottom plan view of the table and attached drag-section of the flask. Fig. 12 is a side or end elevation of the table with the drag-section of the flask attached thereto. Fig. 13 is a transverse section of the table with the drag-section attached, taken on line $x'\ x'$, Fig. 9. Fig. 14 is a front view of part of the machine, showing more especially the piping and pipe connection and valves for operating the upper and lower ramming devices, also for blowing out the sprue-cutter, some of the parts being shown in section. Fig. 14$^a$ is a detail view of the means for operating the valves. Fig. 15 is a view similar to Fig. 14, but showing in addition thereto part of the piping and connection for operating the flask closing or assembling devices and table-cylinders. Fig. 16 is a front view of a portion of the machine, showing the piping and connection and controlling-valves for operating the flask closing or assembling mechanism. Fig. 17 is a side view of part of the machine, showing more especially the piping and connections for operating the ramming devices, the flask closing or assembling devices, and the table. Fig. 18 is a front view of the machine, showing more particularly the piping and connections for operating the table. Fig. 19 shows in plan view the top part of the machine and more especially the piping carried thereby for operating the flask closing or assembling mechanism. Fig. 20 is a view similar to Fig. 19, showing in addition the piping connections for operating the table. Fig. $20^a$ is a detail sectional view of one of the valves. Fig. 21 is a plan view of the piping, valves, and connections for conducting air or fluid pressure to and from the table-operating cylinders. Fig. 22 is a detached detail showing the retaining-slots in the drag-section for engaging the pins of the retaining devices for holding the drag-section in place on the table. Figs. 23 and 24 are a detail sectional elevation and plan, respectively, of the lower end of the flask closing and assembling devices. Fig. 25 is a detached plan view of the upper ramming-cylinder. Fig. 26 is a transverse section of the ramming-cylinder on line $y'\,y'$, Fig. 25; and Figs. 27 and 28 are detail sectional and elevational views of the means on the cope-section for engaging and disengaging the pins of the flask-assembling mechanism.

Referring more particularly to the ramming mechanism and Figs. 1, 2, 3, and 4 of the drawings, the main frame A may comprise any suitable form or character of framework for the support of the operating parts of the machine and in the present embodiment of the invention is shown as consisting of a base A', from which rise the side uprights $A^2$, connected at the top by a top plate $A^3$, the side uprights intermediate their top and bottom portions being provided with a transverse slot $A^4$ for a table to be described, whereby said table may be moved to position beneath a suitable sand-hopper $A^5$ for the purpose of supplying the drag and cope with sand. Mounted upon the base A' of the frame is the lower ramming-cylinder B, in which works a plunger B', carrying at its upper portion a ramming head or plate $B^2$, provided with downwardly-projecting guide-rods $B^3$, passing through guide-lugs $b$ on cylinder B. Springs $b'$ may be interposed between the under side of plate or head $B^2$ and the base A' (see Figs. 2 and 4) to assist in cushioning the downward movement of the plunger B' and prevent shock. Connected to the lower portion of cylinder B is a pipe $b^2$ for the supply of compressed air or other fluid in operating the plunger B, as will more fully hereinafter appear. Adjustably carried by the upper plate $A^3$ of the framework is the upper ramming-cylinder C, in which works a plunger C', carrying the head or plate $C^2$, to which is secured the rammer plate or board which is to enter the cope and ram the sand. This rammer plate or board, it will be noticed, has beveled or undercut edges $c$, whereby the sand in the cope is packed tightly at the edges and around the patterns by a slight inward compression. Secured to the top plate $A^3$ are the corner-blocks $C^4$, in which the guide-lugs on the side of the cylinder move in the adjustment of said cylinder up or down by means of the screws $C^5$, there being one of these screws at each of the four corners of the base-plate $c'$ of the upper cylinder. The screws $C^5$ each project upward above the upper cross-plate $A^3$ of the framework and carry hand-wheels $c^2$, by which they may be turned, to thereby adjust the cylinder and the parts carried thereby up or down, suitable lock-nuts $c^3$ securing the screws in desired position of adjustment. Thus it will be seen that the upper ramming-cylinder C may be moved or adjusted up or down to suit the size and character of cope that is to be rammed. The upper cylinder C, like the lower cylinder B, is provided with guide-lugs $c^4$, in which work the guide-rods $c^5$, secured to the head or plate $C^2$, in order to more accurately guide and steady said head or plate in its ramming and return movement, its downward or ramming movement being effected by compressed air or other fluid supplied to the cylinder by a pipe connection $c^6$, to be hereinafter more fully set forth. To effect the return movement of the upper plunger C' after the ramming action, the head or plate $C^2$ has connected thereto by the link $c^7$ one end of a lever $c^8$, pivoted at $c^{11}$, and carrying at its opposite end a bearing-block $c^9$, upon which a spring $c^{10}$ acts by its expansive force, said spring $c^{10}$ being carried in a suitable casing, as $c^{12}$, secured to the main frame. In order to compensate for any variations in the load to be raised by the spring $c^{10}$, the upper part of the casing $c^{12}$ is provided with a block $c^{13}$, to which is connected an adjusting-screw $c^{14}$, whereby the tension or strength of the spring $c^{10}$ may be varied to suit the conditions of use. From the above construction and disposition of parts it will be noted that the upper plunger is forced to the ramming action by air or fluid pressure and then returned to the normal position, as shown in Fig. 3, by means of the returning mechanism described. Since, however, the upper cylinder C is adjustable by means of screws $C^5$ to suit the character of cope to be rammed, it is evident that provision must be made to accommodate or adjust the returning mechanism if the same tension of the spring $c^{10}$ is to be maintained, and to this end the pivot $c^{11}$ of the lever $c^8$ is carried by a block $c^{15}$, mounted to slide vertically upon the main frame. Below the block $c^{15}$ is a fixed bracket $c^{16}$, through which is screw-threaded an adjusting-screw $c^{17}$, having a head $c^{18}$, by which it may be readily turned. The opposite or upper end of adjusting-screw $c^{17}$ bears upon the sliding block $c^{15}$, whereby it can be moved up or down to suit the position to which the upper ramming-cylinder has been adjusted, thereby maintaining the tension of the returning mechanism unchanged after the same has once been regulated for any series of molds to be formed. Moreover, the adjustment of the block $c^{15}$ and the spring $c^{10}$ give a wide range for regulating the returning action of the plunger, so as to prevent unnecessary shock or jars to the machine, and this, together with the air-cushioning in the cylinder to be described, renders it possible to give ease of movement and a rapid return of the plunger without injurious shocks. Of course variations may be made of these structural features within the scope of the present invention, and it will be understood that the returning mechanism is duplicated each side of the machine.

Referring now to the air or other fluid pressure for actuating the two plungers B' and C' during the ramming operation and directing attention to Figs. 14, 14ª, 15, 16, and 17, D represents a main inlet-pipe connected to a suitable source or supply of air or fluid pressure, said pipe being provided with a globe-valve D' of usual construction for entirely shutting off the supply of air or other fluid when the machine is not in use. Connected to the main supply-pipe D by suitable fittings is the controlling-valve $D^2$, said valve being of usual or any preferred construction and provided with a stem $d$, to which is connected the lever $d'$, fulcrumed at $d^2$ and connected at $d^3$ with an operating-handle $d^4$, from which it will appear that a downward movement of the handle $d^4$, Fig. 17, will raise the valve from its seat and permit the flow of air or other fluid past the same. The lever $d'$ is likewise joined by a link $d^5$ to one end of the trip $d^6$, Fig. 14ª, pivoted to the lug $b$, secured to the lower cylinder B, so that on the opening movement of the valve the trip $d^6$ will be moved on its pivot and the end opposite the connection with link $d^5$ will be depressed, the purpose of said trip and its connections being to enable the valve to be automatically closed when the plunger B' has been raised sufficiently and completed the ramming operation, the air or fluid during the raising of the plunger entering the lower cylinder through the piping connection $d^9$, $d^{10}$, $d^{11}$, and $b^2$, disposed between the valve $D^2$ and said cylinder. Secured to one of the guide-rods $B^3$ of the lower plunger or rammer-head is a collar $d^7$, Figs. 3 and 14ª, having an upwardly-projecting trip-operator $d^8$, which as the plunger reaches the upper limit of its movement engages the free end of the trip $d^6$ and raising it thereby depresses the opposite end, causing the valve to be forced upon its seat and closing communication between the air or fluid supply and the lower cylinder. The valve $D^2$ having been closed in the manner stated, it is desirable to automatically exhaust the air or other fluid from the cylinder B to permit the descent of the plunger, and to this end an exhaust-valve $D^3$ is provided with an operating-stem $d^{12}$, which has a portion projecting into the slot $d^{14}$ of a plate $d^{13}$, carried by the guide-rod $B^3$ of the plunger-head, whereby as said plunger reaches the upper limit of its movement the exhaust-valve $D^3$ is automatically opened simultaneously with or just after the closing of the inlet-valve $D^2$ by contact of the lower end of slot $d^{14}$ with the projection of stem $d^{12}$, so that the plunger may at once start on its return movement, and as it approaches the lowest position the upper extremity of the slot $d^{14}$ in the plate $d^{13}$ acts to close the exhaust-valve $D^3$ by contact with the projection of stem $d^{12}$, to thereby assist the springs $b'$ $b'$ in checking the downward movement of the plunger and to cushion the same. The exhaust-air from the cylinder B passes through the exhaust-valve $D^3$ into the pipe $D^4$, Fig. 14, which at its upper end is connected by a flexible tube or hose $D^6$ to a sprue-cutter $D^5$, carried by the plunger-head of the upper ramming devices, so that any sand lodging in the sprue-cutter will be at once discharged. Thus it will be seen that the sprue-cutter after each operation is automatically cleaned by the exhaust air or other fluid and is in consequence always clean and reliable when starting to cut another hole.

In a machine of the character under consideration it is desirable that both the lower and upper plungers shall act simultaneously during the ramming operation, and to this end a pipe connection is made with the upper cylinder, as shown in Figs. 14, 15, 16, and 17, such connection comprising the pipe $D^7$, which by a T-fitting $D^8$ is connected to the piping leading to the lower cylinder between the said lower cylinder and the valve $D^2$, so that air or other fluid pressure passing through the valve $D^2$, as hereinbefore described, will go in two directions (shown by arrows on Figs. 14 and 15) through the pipes $d^{11}$ and $D^7$. To the pipe $D^7$ is connected the pipe $D^9$, connected at the top portion of the machine by flexible hose $D^{10}$ with the inlet $c^5$, Figs. 3 and 4, leading to the upper cylinder C. Since the pipe $D^7$ connects directly with pipe $d^{11}$, leading to the lower cylinder B and from thence to the exhaust-valve $D^3$, it follows that the two valves $D^2$ and $D^3$ control the flow of air or other fluid to and the exhaust from both the upper and lower cylinders C and B. In other words, when valve $D^2$ is opened fluid-pressure will flow through said valve into fitting or pipe $d^9$ and from thence into the T-fitting $D^8$, where it will divide, part passing to the lower cylinder B through pipes $d^{11}$ and $b^2$ and part passing to the upper cylinder C through pipes $D^7$, $D^9$, and $D^{10}$, and on the exhaust, which, as before explained, is controlled by the upward movement of the lower plunger, the valve $D^3$ is opened, permitting the fluid-pressure to pass from both the upper and lower cylinders backward through the piping connections. It will also be apparent that the entire operation so far described, with the exception of the hand manipulation through the handle $d^4$ for opening the valve $D^2$, is entirely automatic—that is, when the upper and lower plungers have moved sufficiently for the ramming operation the valve $D^2$ is automatically moved to shut off further supply of fluid-pressure and the valve $D^3$ is automatically operated to permit the escape of the pressure from both the upper and lower cylinders to permit their return to normal non-ramming positions, whereupon the exhaust-valve $D^3$ is automatically closed.

Having described the upper and lower ramming devices and the means for controlling the movements of each, description will now be given of the table which supports the drag and cope sections of the flask and other mechanism incidental to the formation of a completed mold.

As hereinbefore stated, the main frame is provided with a slot $A^4$, so that the table E may be moved to position between the upper and lower ramming devices or to one side thereof and under the hopper $A^5$ to enable the flask-sections to be supplied with sand. In the slot $A^4$ on each side of the machine-frame is a sliding plate or slide E', suitably held between the upper and lower walls of the slot, as by the track and groove $e$, Fig. 3, and said sliding plate carries supporting-studs $E^2$ $E^2$, which engage suitable bearings $E^3$ $E^3$, one at each end of the table, Figs. 3, 10, 11, and 12, so that the table while movable with the sliding plates E' E' is also capable of being turned upon its supporting-studs, springs $e'$ being preferably employed to assist the turning of the table with the drag side up, as will further appear, when said table is freed from the flask.

In order that the slides E' may be disengaged from the slots $A^4$ when desired to remove them or the table for any purpose, I have enlarged the slot $A^4$ near one end thereof and filled the enlarged portion by a removable section $E^4$, which may be secured in place to complete the proper track for the sliding plates E' by suitable clamps $e^2 e^2$. (See Fig. 1.) The slides E' E' have each connected to them, preferably on the outside of the framework, the pistons $E^5$ $E^5$, which operate in cylinders $E^6$ $E^6$, Fig. 1, whereby upon the admission of compressed air or other fluid to said cylinders in proper sequence the slides E' E' and the table E carried thereby may be moved to different position on the framework, as will be obvious. The particular piping connection with the cylinders $E^6$ $E^6$ to effect the desired admission and exhaust of fluid thereto will be explained at length hereinafter, the purpose at this time being to describe the particular construction of table and its mode of operation.

Having reference more particularly to Figs. 9, 10, 11, 12, and 13, the table (designated as a whole by E) comprises the end portions $E^x$ and side portions $E^7$, the top and bottom surfaces of the structure being suitably removed to receive the stripping-plates $E^8$ $E^9$ for the cope and drag sections, respectively, of the flask. In the present form of table these stripping-plates are secured in fixed position with respect to the table, and disposed within the table, Fig. 10, adjacent to the stripping-plates $E^8$ and $E^9$, are the pattern plates or supports $E^{10}$ $E^{11}$, which carry the patterns for the formation of the mold, while between the pattern plates or supports $E^{10}$ $E^{11}$ is the stool-plate $E^{12}$. Since the stripping-plates $E^8$ and $E^9$ are immovable with respect to the table, the pattern plates or supports $E^{10}$ $E^{11}$ are made movable with respect to the stripping-plates $E^8$ $E^9$ in order to withdraw the patterns carried thereby from the cope and drag sections of the flask after the ramming operation. In the present embodiment of the invention each of the pattern plates or supports $E^{10}$ and $E^{11}$ has end extensions $E^{13}$, Figs. 10 and 11, provided with holes or perforations, through which pass the guide-rods $E^{14}$ $E^{15}$ for directing the movement of the pattern plates or supports as they move to and from the stripping-plates, springs $e^3$ surrounding said rods, as shown in Fig. 10, and normally tending to hold the pattern-plates $E^{10}$ $E^{11}$ against their respective stripping-plates $E^8$ $E^9$. Mounted upon studs $e^4$, one near each of the four corners of the pattern-plate extensions $E^{13}$, Figs. 10, 11, and 13, are the locking trip-cams $E^{16}$, normally maintained in the position indicated in Fig. 10, with the peripheral surface of the cams in engagement with the inner surface of the pattern-plate extensions by means of springs $e^5$, which thereby lock, and thus support, the pattern-plates $E^{10}$ $E^{11}$ in the position shown, Fig. 10, so that during the ramming action the pattern-plates and patterns will be held rigidly in position. Each of the locking trip-cams $E^{16}$ has an engaging projection $e^6$, which after the ramming operation is adapted to be struck by a trip-arm, whereby the pattern-plates are freed from the locking-cams and free to be moved to withdraw the patterns from the sand, the trip-arms at such times entering holes $e^7$ in the table, as will now be described.

Suitably secured to the main frame both above and below the four corners of the table E are the stripping devices for moving the pattern-plates to withdraw the patterns from the sand, said devices, of which there are eight, four above and four below the table, comprising the cylinders $e^8$, Figs. 1, 2, 3, and 4, in which works a suitable piston $e^9$, Fig. 3, carrying a trip-arm $e^{10}$ and a stripping-arm $e^{11}$, the pistons $e^9$ being normally retained in position with the said arms functionally inoperative—that is, drawn toward the cylinders $e^8$—by means of springs $e^{12}$, Fig. 3. The cylinders $e^8$ are connected by piping in a manner to be described, so that at the desired time the pistons $e^9$ may be acted upon and the trip-arms $e^{10}$ caused to enter the holes $e^7$, Fig. 10, and trip the locking-cams from their engagement with the pattern-plates, whereupon the pattern-plates, being now free except for the springs $e^3$, the stripping-arms $e^{11}$ engage the studs $e^{13}$, projecting one from each corner of each pattern-plate $E^{10} E^{11}$, and force the pattern-plates inward of the table, thus withdrawing the patterns from the sand. The spring $e^{12}$ now returns the pistons $e^9$ to their original positions, withdrawing the trip-arm and stripping-arm from engagement with the locking-cams $E^{16}$ and studs $e^{13}$, respectively, whereupon the springs $e^3$ return the pattern-plates $E^{10}$ and $E^{11}$ to their original position against the inner surfaces of the stripping-plates $E^8$ and $E^9$, and the springs $e^5$ turn the locking-cams into locking position under the end extensions of the pattern-plates.

It will be evident, of course, that many changes in form and character of the specific details of table construction may be suggested to one skilled in the art; but these I regard as fully within the scope of the present invention, which in the respects noted is not restricted to the precise details selected as the preferred embodiment thereof.

It is the purpose of the present invention to form both the cope and drag sections of the flask simultaneously or at one ramming operation, and to this end the drag-section of the flask is first placed upon the table, which at that time is turned by hand to bring the drag side of the table uppermost, so that the desired quantity of sand may be supplied to the drag-section from the hopper A. After the drag-section has thus been supplied with sand it is necessary to turn the table on its supporting-studs to bring the cope side thereof uppermost, at which time, as is obvious, means must be employed for holding the drag-section to its side of the table, which is now the under surface, and this means will now be described.

Secured to each side of the table E (see Figs. 9, 11, 12, and 13) is a plate $f$, having the slot $f'$, to which is connected by the studs or pins $f^2$ the adjusting-plates $f^3$, carrying screw-threaded projections $f^4 f^4$, which are engaged by the right and left adjusting-screws $f^5 f^5$, held in suitable bearings $f^6$ and having each a bevel-gear $f^7$ secured to their adjacent ends. It is to be understood, of course, that the mechanism now being described is duplicated on both sides of the table, as shown in Fig. 11. A shaft $f^8$, extending transversely through the table E and having suitable ends $f^9$, either of which may be engaged by a hand-crank for turning said shaft $f^8$, has secured to it at opposite sides of the table bevel-gears $f^{10} f^{10}$, which, meshing with bevel-gears $f^7 f^7$ on the screw-shafts $f^5 f^5$, serve to rotate said shafts on both sides of the table in unison for the purpose of thereby adjusting the plates or slides $f^3 f^3$ toward and away from each other to accommodate the holding means for the drag to different sizes of drag, as will presently appear.

Pivotally connected to the plates or slides $f^3 f^3$ at $f^{11} f^{11}$ are the holding-arms F, the pivots $f^{11}$ of said arms each being surrounded by a spring $f^{12}$, tending to normally throw the arms in a direction to separate the free ends of the arms on the same side of the table. Joining the free ends of the arms F F on opposite sides of the table are the plates F' F', to each of which are connected the plates $f^{13} f^{13}$ by means of the pins $f^{14} f^{14}$ and slots $f^{15} f^{15}$, whereby said plates $f^{13} f^{13}$ may slide to a limited extent lengthwise of the plates F' F', said plates $f^{13} f^{13}$ being normally pressed toward each other by springs $f^{16} f^{16}$, carried by the rods $f^{17} f^{17}$, mounted in the plates F' F', as will clearly appear from Figs. 11 and 12. Mounted on each side of the drag-section of the flask are the slot-plates $F^2$, (shown in Fig. 22 on an enlarged scale,) each of said slot-plates being provided with oppositely-arranged keyhole-slots $f^{18}$, which are adapted for engagement with head-retaining pins $f^{19} f^{19}$, carried by the plates $f^{13} f^{13}$ and projecting through suitable slots in the plates F'. (See Fig. 11.) From this construction it will be clear that the headed retaining-pins $f^{19}$ being in engagement with the keyhole-slots $f^{18}$ the springs $f^{16} f^{16}$ will move the heads of the pins to the narrow parts of the slots and lock the drag-section to the holding-arms F.

It is also necessary to hold the bottom or ramming board $F^3$ in place to keep the sand from falling out of the drag when the table is reversed. This bottom or ramming board $F^3$ is shown clearly in Figs. 10, 11, 12, and 13 and consists simply of a piece of suitable size to enter the drag under the stress of the ramming action, said piece having cross-braces $F^4 F^4$ and a bevel inner edge $f^{20}$ to pack the sand tightly around the patterns. To hold this board in place as the table is reversed, the cross-pieces F' F', joining the holding-arms F F, are each provided with holding-fingers $f^{21}$, projecting therefrom and having their ends $f^{22}$ turned over or bent to overlie the edges of board $F^3$ when the holding-arms F F are in their holding position, as shown in Fig. 9.

In order that the drag-section may be automatically detached from the table during the ramming action, so that it may descend with the lower plunger as that recedes, the plates $f^{13} f^{13}$ are each provided with extensions $f^{23} f^{23}$, Fig. 12, having beveled adjoining edges, as at $f^{24}$, and secured to the lower plunger-plate $B^2$, Fig. 3, are the disengaging projections $f^{25} f^{25}$, having beveled ends $f^{26} f^{26}$, which as the lower plunger-plate rises in the ramming action of the machine engage between the beveled edges $f^{24}$ of plates $f^{13} f^{13}$ and separate said plates against the tension of springs $f^{16} f^{16}$, pushing the headed pins $f^{19} f^{19}$ to the large part of the keyhole-slots $f^{18} f^{18}$, whereupon the springs $f^{12} f^{12}$ about the pivots $f^{11} f^{11}$ of the holding-arms F F at once throw said arms away from the sides of the drag, leaving the drag (represented in general by $F^5$) free and resting upon the lower plunger head or plate $B^2$. If desired, suitable holes, as $f^{27}$, may be provided in each of the stripping-plates $E^8$ and $E^9$ for the reception of pins secured to the drag and cope sections of the flask to properly position these parts when placed upon the table.

The drag-section of the flask, as hereinbefore stated, is first placed to the table E with the drag stripping-plate uppermost and sand is fed into the drag around the patterns from the hopper $A^5$. The bottom board $F^3$ is then adjusted and the holding-arms F swung to bring the headed retaining-pins $g^{19}$ into engagement with the keyhole-slots $f^{18}$ and the ends $f^{22}$ of the holding-fingers over the bottom board $F^3$, whereupon the table is turned on its supporting-studs to bring the cope side of the table uppermost. The cope-section is then applied and sand fed thereto from hopper $A^5$, whereupon the table carrying the cope and drag sections of the flask is moved by the pistons $E^5$ to position between the upper and lower ramming devices, as heretofore explained, and the ramming action takes place by manipulation of the handle $d^4$, the plungers approaching each other and ramming the sand simultaneously in the drag and cope sections and then receding from the table, the drag at such time going down with the lower plunger head or plate $B^2$ and the cope being carried up by the assembling mechanism, which will now be described.

Adjustably mounted in the top of the machine-frame in a manner to be hereinafter described are the four assembling-cylinders G G G G, (see detail showing, Figs. 3, 6, 7, and 8,) in each of which cylinders works an ordinary plunger or piston-rod G', carrying at its lower end a cope-lifter comprising a cylinder $G^2$, having an engaging pin $g$ normally acted upon by a spring $g'$, Fig. 23, to cause the pin $g$ to project beyond the end of cylinder $G^2$. Secured to the cope (designated generally by $G^3$) are the lifting-lugs $g^2$, each having beveled upper edges $g^3$ and an opening $g^4$, Fig. 27, which may be protected by a perforated plate $g^5$, secured to the end surface of the lug, it being understood that there is one of these lifting-lugs near each of the four corners of the cope-section of the flask in position to be engaged by the pins $g$, as will appear. Movable in the lugs $g^3$ are the trip-pins $g^6$, one in each lug and each acted upon by a spring $g^7$, which normally keeps the end $g^8$ of the trip-pin retracted and within the opening $g^4$ of the lug. Each pin $g^6$ has a head $g^9$, having a beveled side $g^{10}$, which is engaged by a similarly-beveled head $g^{11}$ on a pin $g^{12}$, vertically movable in suitable recesses $g^{13}$, formed in the walls of the cope, each of the pins $g^{12}$ having a part, as $g^{14}$, Figs. 27 and 28, projecting below the plane of the bottom of the cope.

Secured to the upper rammer plate or head $C^2$ are the side extensions $g^{15}$, which embrace the plungers or piston-rods G', and on each of the said plungers or piston-rods G' below the side extensions $g^{15}$ are the collars $g^{16}$, whereby as the plunger C' and head $C^2$ are forced downward during the ramming action the said plungers or piston-rods G' are pulled lengthwise outward of their respective cylinders. As the engaging pins $g$ pass the lifting-lugs $g^2$ the former pass over the beveled edges $g^3$ of said lugs, and then by virtue of the springs $g'$ the pins $g$ are forced into the openings of the lugs $g^2$, thereby locking the cope to the lifting devices, so that as the ramming-head rises after the ramming operation and the plungers G' are forced upward in their cylinders by the air or other fluid pressure, to be described, the cope-section of the flask will also be carried upward. At this time also it is to be noted that the lower plunger head or plate is lowered, carrying with it the drag-section of the flask, as already explained, so that the table E is now free to be moved from between the drag and cope sections and moved under the hopper $A^5$, to be supplied with other drag and cope sections and then these charged with sand. While the parts are in this position—that is, with the cope held by the assembling devices and the drag on the lower plunger head or plate and the table E moved from between the drag and cope sections—air or other fluid pressure is admitted to the cylinders G in a manner to be described, so that the plungers G' are forced downward to place the cope on top of the drag. The placing of the cope upon the drag, as thus outlined, causes the pin ends $g^{14}$ to engage the walls of the drag, forcing the pins $g^{12}$ upward, thereby forcing pin $g^8$ outward and disengaging the engaging pins $g$ from the lugs $g^2$ and leaving the drag and cope assembled. The plungers G' are then raised, as will appear, and the device is ready to repeat the operation. When the plungers or piston-rods G' are not being acted upon by the air or other fluid pressure in the manner to be described, they are held in their raised position, as shown in Fig. 8, by means of springs $g^{17}$, secured to the top of cylinders G and to pins $g^{18}$, projecting from the lower part of plunger-pistons G'.

It is desirable in this class of devices that the same machine be readily adaptable for the formation of molds of varying sizes, to effect which it becomes necessary to adjust the assembling devices to the size of mold or flask desired, and to this end the following mechanism is employed, reference being had more particularly to Figs. 5, 6, 7, and 8: Mounted on the top plate of the machine are the bearings H' H', carrying the shaft H, having the opposite end portions provided with right and left screw-threads $H^2$ $H^2$, said shaft H being also provided with suitable means for turning it in either direction and comprising in the present form and embodiment of the invention a bevel-gear $H^3$, which meshes with a corresponding beveled gear $H^4$, secured to the shaft $H^5$, which is carried in suitable journals in an upright $H^6$. The said shaft $H^5$ may be provided with a hand-wheel, as $H^7$, disposed outside of the hood $H^8$, which preferably covers all the mechanism on the top of the machine to keep out dirt and prevent injury thereto, so that by manipulation of the hand-wheel the shaft H may be readily turned in either direction. The cylinders G of the flask-assembling mechanism extend through the top portion of the main frame, there being preferably four of such cylinders, and each is provided with a block $h$ secured to or formed integral therewith and carried by an upper slide-plate $h'$, having a guiding projection $h^2$, which is engaged by a suitably-shaped guiding-groove $h^4$ in a plate $h^3$, (see Figs. 6, 7, and 8,) whereby the upper slide-plates $h'$, carrying the individual cylinders G, may be moved to or from the ends of the machine, or, in other words, the two cylinders at opposite ends of the machine may be moved toward and away from each other by movement of the upper slide-plates $h'$ in the grooves $h^4$, as will be obvious. The plates $h^3$, which for identification may be termed the "lower slide-plates," are similarly provided with a guide-groove $h^5$, and said groove $h^5$ engages in its under surface, arranged at right angles to the guide-groove $h^4$, a projection $h^6$, formed upon a plate $h^7$, secured to the top portion of the machine-frame. The lower slide-plates $h^3$ thus provide for the adjustment of the pairs of cylinders G at each end of the machine toward and from each other, so that by the slide-plates described the four cylinders may be adjusted into any desired position to accommodate the size or character of flask in use. Connecting the blocks $h$ $h$ of the pairs of cylinders G G at each end of the machine are the right and left screw-shafts $H^9$, which for identification may be known as the "transverse adjusting-shafts," said shafts each being provided with a suitable hand-wheel $H^{10}$, by which it may be readily turned as desired. Turning of the transverse adjusting-shafts, as is obvious, will cause the right and left screws thereon to move the slides $h^3$ and the parts, such as slides $h'$ and cylinders G, at each end of the machine toward and from each other. Each of the transverse adjusting-shafts $H^9$, between the blocks $h$, is provided with fixed collars $h^8$ $h^8$, between which is supported a block $h^9$, the upper portion $h^{10}$ of which is screw-threaded to engage one end of shaft H, from which it will be seen that by turning the shaft H the blocks $h^9$ $h^9$ are moved toward and from each other, thus also moving the transverse adjusting-shafts, and with them the slides $h'$ $h'$, carrying the two end cylinders, all of which will be clear from Figs. 5, 6, 7, and 8. In order to properly aline and support the screw-shaft H, the end and center bearing H' H' therefor are preferably shown as in Fig. 7 and consisting of a ring-like support $h^{11}$, held in position by means of adjusting-screws $h^{12}$ $h^{12}$, whereby the ends or center of shaft H may be readily adjusted as desired.

From the construction of the assembling devices and their means of adjustment, as just described, it will be noted that the cylinders G G may be adjusted to any desired position to bring the cope-lifting cylinders $G^2$ and the engaging pins $g$ into position to properly cooperate with the lifting-lugs $g^2$ of the cope irrespective of the varying sizes of cope employed and that while I have described in detail one form of mechanism suitable to secure the desired object my invention is not to be understood as limited thereto, as many changes in character and forms of these devices may suggest themselves to one skilled in the art, and these I desire to be understood as included in my present invention.

The invention as thus far described has had main reference to the construction and general operation of the various features which go to make up the organized device, and I will now direct attention to the means for operating the various parts in the necessary order or sequence to produce the finished mold. In referring to the piping and pipe-lines connecting the various parts and to the valve constructions interposed in such pipe-lines it is to be noted that I do not wish to have myself understood as limiting my invention to such particular disposition of the piping and valves, as many changes may be made therein and the lines of pipe otherwise disposed without departing from the spirit of my present invention.

Reference has already been made to the air or other fluid connections for operating the upper and lower ramming devices during the ramming operation, and I will now first describe the manner of operating the plungers or piston-rods G' in the cylinders G.

It will be noted that as the upper ramming plunger and head descend the plungers G' are drawn outward of their respective cylinders G to enable the fingers $g$ to engage the lifting-lugs $g^2$ on the cope-section of the flask. As the upper ramming plunger or head rises after having rammed the sand in the cope it is desirable that the cope shall also be raised by the fingers $g$, so that the table may be moved from between the ramming devices, and this is accomplished by air or other fluid pressure admitted to the cylinders G through the following piping connection, reference being had particularly to Figs. 15, 16, and 20: Connected to the main inlet-pipe D at $i$ is the pipe I, leading, as shown, to the top of the machine-frame, where by means of pipe $i'$ it joins to the valve $V^3$, which may be any usual form of lift-valve having a stem connected to an operating-handle $i^2$, which projects into the slotted operating-arm $i^3$ of an adjustable arm $i^4$, secured to one of the guide-rods $c^5$ of the upper ramming devices, Fig. 16, in a manner similar to the operative connection of the exhaust-valve $D^3$ for the upper and lower cylinders B and C, as already described. Connected to the valve $V^3$ is the piping $i^5$ and two-way connection $i^6$, Fig. 20, leading through suitable pipe connections $i^7$ into the piping $i^8$ and $i^9$, which at their respective ends are joined by hose $i^{10}$, Figs. 16 and 20, with the lower portions of two of the cylinders G G. Similarly through the piping $i^5$ and connection $i^6$ the valve $V^3$ is joined by piping $i^{11}$ $i^{12}$ $i^{13}$ and hose $i^{14}$ $i^{14}$ with the other two cylinders G G. As the upper ramming-plunger reaches the end of its downward stroke the operating-arm $i^3$ opens the valve $V^3$, permitting the air or other fluid to enter the lower portions of the cylinders G G, as will be clear, and since the fingers $g$ are at this time engaged with the cope-lifting lugs the upward movement of the plungers will lift the cope and carry it from the table, the upper ramming-plunger also at such times moving upward the operating-arm $i^3$ will as the plunger reaches the upper limit of its movement close the valve $V^3$. It now becomes necessary to exhaust the air or fluid pressure from the lower portions of the cylinders G in order that the plungers or piston-rods $G'$ may again be lowered to place the cope upon the drag, and any suitable means may be employed for this purpose. In the present instance one of the cylinders G is provided with an exhaust-opening near the upper portion connected to pipe $i^{15}$, Figs. 16 and 20, whereby as the plungers reach the upper limit of their movement openings may be uncovered, so that the air or fluid from all of them may exhaust back through the pipe $i^{15}$, the plungers or piston-rods at such times being retained in their upper or raised position by the springs $g^{17}$, Fig. 8. The air or other fluid passing into pipe $i^{15}$ passes into pipe $i^{16}$, then into valve $V^4$, and pushing back the plunger of that valve, Figs. 20 and 20$^a$, opens up two exhaust-holes $i^{18}$, from which the air or other fluid escapes.

Prior to raising the plungers or piston-rods $G'$ and the cope-section of the flask attached thereto it is necessary to withdraw the patterns from both the cope and drag by pushing the pattern-plates inward of the table E, which is accomplished by the trip and stripping arms $e^{10}$ $e^{11}$ in the following manner: The air or fluid pressure passing to valve $V^3$ also has a pipe connection $k$ with a valve $V^2$, which is provided with a stem $k'$, operated by the slotted arm $k^2$ of a collar $k^3$, adjustably mounted upon one of the guide-rods $c^5$ of the upper plunger-head (see Figs. 15 and 16) in a manner similar to the operation of the valve $V^3$ already described. From valve $V^2$ the air or fluid pressure passes by piping $k^4$ $k^5$ $k^6$ to the connections $k^7$ $k^8$, which lead to the cylinders $e^8$ $e^8$ to turn the locking trip-cams $E^{16}$ and then act upon the studs $e^{13}$ on the pattern-plates to force said pattern-plates toward the center of the table to thereby withdraw the patterns from the cope and drag sections of the flask and leaving said sections free to be taken from the table. This action of the trip-arms and stripping-arms is timed to take place immediately at the end of the ramming operation, and as the upper ramming-plunger arrives at the upper limit of its movement the valve $V^2$ is operated to exhaust the air or fluid pressure from cylinders $e^8$, whereupon the springs in said cylinders return the pistons and trip and stripping arms to their original or retracted position, permitting the pattern-plates and locking trip-cams to also return to their original position, ready for another operation. The cope and drag being now free to be taken from the table E, the cope rises with the plungers $G'$ $G'$, as already explained, and it now becomes necessary to move the table E from between the upper and lower ramming devices to enable the parts of the flask to be assembled and other cope and drag sections to be secured to the table for further operations.

Referring more especially to Figs. 15, 17, 20, and 21 to illustrate the piping connection for moving the table E to and from position between the ramming devices, $E^6$ represents the table-operating cylinders at the front of the machine for moving the table from position between the ramming devices, and $E^{60}$ represents the cylinders at the rear of the machine for returning the table to position between the ramming devices. In treating of the table-operating cylinders attention will be first directed to the valve $V^4$, Figs. 20 and 20$^a$. This valve comprises a piston $o$, having two stems $o'$ $o^2$ entering the pipe connections $o^3$ and $o^4$, in which are formed, respectively, the exhaust-ports $i^{18}$ and $m^{11}$, the piston $o$ being movable by air or other fluid pressure to open and close communication between pipes $m$ and $m'$. For instance, when the piston $o$ is in the position shown by Fig. 20$^a$ the piston shuts off communication between pipes $m$ and $m'$ and also closes exhaust-ports $i^{18}$ in connection $o^4$; but when the piston is at the opposite end of its stroke communication is established between pipes $m$ and $m'$ and exhaust-ports $i^{18}$ are opened, while exhaust-ports $m^{11}$ are closed. Of course it is to be understood that I do not limit my invention to this particular form of valve. The plungers or piston-rods G' having raised the cope-section of the flask from the table, it being understood also that the drag-section has gone down with the lower plunger head or plate, the air or other fluid from the lower parts of the cylinders G exhausts, as hereinbefore explained, through $i^{15}$ and $i^{16}$ and, acting upon the end of piston-stem $o'$, Fig. 20$^{a}$, forces the piston $o$ to the opposite end of its stroke, thus opening up exhaust-ports $i^{18}$ and permitting the air or other fluid from lower part of cylinders G to escape therethrough. Now this movement of the piston $o$ occurs when plungers or piston-rods G' are at the upper limit of their movement and opens communication between pipes $m\ m'$, permitting air or other fluid to pass from the pipe I through the valve into pipes $m^{2}$, then in opposite direction through $m^{3}$ and $m^{4}$ and their respective piping connections $m^{5}$ $m^{6}$ and $m^{7}$, $m^{8}$, and $m^{9}$ into the two front cylinders $E^{6}$, whereby the piston and rods $E^{5}$, operated thereby, are caused to move the table on its guideways to the rear of the machine. As the pistons (see $m^{12}$, Fig. 20, for instance) move to the limit of their stroke they open the exhaust-port $m^{13}$ in cylinder $E^{6}$ at the left of Fig. 20, and the air or other fluid pressure then passes through $m^{10}$ and, acting on the end of the stem $o^{2}$ of piston $o$, forces the piston to the opposite end of its stroke, thus shutting off communication between pipes $m$ and $m'$ and opening the exhaust-ports $m^{11}$, from which the fluid-pressure now having completed the back movement of the table exhausts from both of the cylinders $E^{6}$, thus leaving the table free to be moved between the ramming devices again by the cylinders $E^{60}$ and pistons $l^{7}$, Fig. 17, therein located on the back of the machine-frame. Connected to the pipe I is pipe L, through which fluid-pressure may pass to pipes L' $l'$ $l^{2}$ to valve $L^{2}$, which being any usual form of piston-valve and forming no essential part of the invention need not be described in further detail, into pipe $l^{3}$, and fitting $l^{8}$ divides the fluid-pressure so that part passes through pipe $l^{4}$ and part through pipes $l^{9}$ and $l^{10}$ into the ends of cylinders $E^{60}$, whereby the table may be returned to its former position between the ramming devices after it has been supplied with another cope and drag and a charge of sand in each. As piston $l^{7}$, Fig. 17, in cylinder $E^{60}$ nears the end of the working stroke it uncovers an exhaust-port $l^{5}$, from which the fluid-pressure passes to valve $L^{2}$ and exhausts through the opening $l^{6}$ therein, the table being now situated between the ramming devices. Prior to returning the table to position between the ramming devices, however, it is necessary to assemble the cope and drag to complete the flask, and this operation will now be explained, it comprising in substance the lowering of the plungers G', carrying the cope, so that it may be placed upon the drag. Inasmuch also that a core may be desirable and necessary to adjust to proper position, a hand-operated valve P, Fig. 17, is provided in the pipe $p$, which is connected to a suitable source of air or fluid supply—as, for instance, the pipe I—by connections $p'$ and $p^{2}$. Extending to the top of the machine-frame the pipe $p$ is connected by pipes $p^{3}$, $p^{4}$, $p^{5}$, and $p^{6}$ to flexible hose connections $p^{7}$, which lead to the upper portions of the cylinders G, (see Figs. 15, 16, 17, and 20,) so that upon hand manipulation of valve P air or other fluid pressure will be admitted to the upper parts of cylinders G to depress the plungers G'. As heretofore explained, however, one of the cylinders G is provided with an exhaust $i^{15}$, which by connection $i^{16}$ leads to valve $V^{4}$, so that it becomes necessary simultaneously with the admission of air or other fluid to the top portions of cylinders G, as explained, to also close the connection between exhaust $i^{15}$ and the ports or openings $i^{18}$, controlled by the valve-stem $o'$, and to this end an ordinary piston-valve $V^{5}$, Fig. 20, is interposed in the pipe connection between exhaust $i^{15}$ and ports or openings $i^{18}$, said valve comprising a piston $s$, contained within a suitable casing and acted upon by a spring, Fig. 20, to normally permit communication between exhaust $i^{15}$ and ports or openings $i^{18}$, and this valve is connected by suitable piping $s'$ $s^{2}$ $s^{3}$ with pipe $p^{4}$, so that as air or fluid pressure enters the upper ends of cylinders G it also closes valve $V^{5}$ to prevent escape of the pressure that would otherwise result. When the cope has been properly positioned on the drag, the valve P is manipulated to permit the air or fluid pressure to exhaust, whereupon the springs $q^{7}$ return the plungers G' to their original positions.

I have herein shown a form of feeding mechanism for feeding the hopper $A^{5}$ with sand; but such mechanism forms no part of the present invention.

Having thus described my invention, what I claim, and desire to secure by Letters Patent, is—

1. In a machine of the character described, the combination of a table for supporting the cope and drag sections of a flask, upper and lower ramming devices for ramming the cope and drag sections, means carried by the lower ramming devices for disengaging the drag-section from the table, assembling devices independent of the upper ramming devices but movable thereby into engagement with the cope-section of the flask, and means actuated by the upper ramming devices to cause the assembling devices to lift the cope from the table.

2. In a molding-machine, the combination of a table adapted to support the cope and drag sections of a flask, upper and lower ramming devices for ramming the cope and drag sections, assembling devices for engaging and lifting the cope-section from the table, and means for adjusting the assembling devices in accordance with the size of flask to be formed.

3. In a molding-machine, the combination of a table adapted to support the cope and drag sections of a flask, upper and lower ramming devices for ramming the cope and drag sections, means carried by the lower ramming devices for detaching the drag-section from the table, assembling devices for engaging and lifting the cope-section from the table, and means for adjusting the assembling devices in accordance with the size of flask to be formed.

4. In a molding-machine, the combination of a table for supporting the drag and cope sections of a flask, upper and lower ramming devices, assembling devices for engaging and lifting the cope-section and thereafter lowering the same upon the drag-section, said assembling devices being independent of but controlled as to their operation by movement of the upper ramming devices.

5. In a molding-machine, the combination of a table for supporting the drag and cope sections of a flask, upper and lower ramming devices, assembling devices for engaging and lifting the cope-section and thereafter lowering the same upon the drag-section, said assembling devices comprising upright cylinders, plungers movable in said cylinders, and means carried by said plungers for engaging the cope-section of the flask.

6. In a molding-machine, the combination of a table for supporting the drag and cope sections of a flask, upper and lower ramming devices, assembling devices for engaging and lifting the cope-section and thereafter lowering the same upon the drag-section, said assembling devices comprising upright cylinders, plungers movable in said cylinders, means carried by said plungers for engaging the cope-section, air or other fluid inlets leading to the lower ends of said cylinders, and a valve controlled by movement of the upper ramming devices for opening and closing communication between said inlets and a source of fluid-supply.

7. In a molding-machine, the combination of a table for supporting the drag and cope sections of a flask, upper and lower ramming devices, assembling devices for engaging and lifting the cope-section and thereafter lowering the same upon the drag-section, said assembling devices comprising cylinders and plungers working therein, means carried by the plunger for engaging the cope-section of the flask and means for adjusting the cylinders with relation to each other.

8. In a molding-machine, the combination of a table for supporting the drag and cope sections of a flask, upper and lower ramming devices for ramming both of said sections, assembling devices including pins for engagement with the cope-section to raise and sustain the same, and means carried by the cope-section for disengaging the pins from the cope-section when the same is placed upon the drag-section.

9. In a molding-machine, upper and lower ramming devices, a table adapted to be supported between said devices and sustain the cope and drag sections of a flask, each of said ramming devices comprising a cylinder and plunger working therein, means for introducing air or other fluid pressure into both of said cylinders, a single inlet-valve for controlling the exhaust of air or other fluid from both of said cylinders, and means operated by one of the plungers for closing the inlet-valve at the end of the ramming action and opening the exhaust-valve.

10. In a molding-machine, upper and lower ramming devices, a table adapted to be supported between said devices and sustain the cope and drag sections of a flask, each of said ramming devices comprising a cylinder and plunger working therein, means for introducing air or other fluid pressure into both of said cylinders, a single outlet-valve for controlling the exhaust of air or other fluid from both of said cylinders, and means operated by one of the plungers for closing the inlet valve at the end of the ramming action and opening the exhaust-valve, a sprue-cutter, and connections between the sprue-cutter and the exhaust-valve for blowing or cleaning out the sprue-cutter after each operation.

11. In a machine of the class described, the combination of ramming devices comprising a cylinder and plunger, means for introducing fluid-pressure into the cylinder for operating the plunger, an exhaust for said cylinder, a sprue-cutter, and connections between the sprue-cutter and the exhaust of the cylinder for causing the exhaust to blow or clean out the sprue-cutter.

12. In a molding-machine, the combination of a table adapted to support the cope and drag sections of a flask, upper and lower ramming devices for simultaneously ramming both cope and drag sections, means for moving the upper and lower ramming devices to and from the ramming action, and means for thereafter automatically moving the table from position between the upper and lower ramming devices.

13. In a molding-machine, the combination of upper and lower ramming devices, a table adapted to support the cope and drag sections of a flask, a slide carrying said table, cylinders and plungers for moving the slide and table to and from position between the ramming devices, means for introducing air or other fluid to the ramming devices to operate the same, and means for automatically introducing air or fluid to the said cylinders to move the table from between the ramming devices after the ramming action.

14. In a molding-machine, the combination of upper and lower ramming devices, a table adapted to support the cope and drag sections of a flask and movable to and from position between the upper and lower ramming devices, assembling mechanism for raising the cope-section of the flask from the table after the ramming action, and means controlled by movement of the assembling mechanism for moving the table from position between the ramming devices as the cope-section is raised therefrom.

15. In a molding-machine, the combination of upper and lower ramming devices, a table adapted to support the cope and drag sections of a flask and movable to and from position between the upper and lower ramming devices, air or other fluid operated assembling mechanism, means for introducing the air or other fluid thereto after the ramming action to cause the same to lift the cope-section from the table, an exhaust for the air or other fluid so introduced, and means set in operation by the exhaust for moving the table from position between the ramming devices.

16. In a molding-machine, the combination of upper and lower ramming devices, a table adapted to support the cope and drag sections of a flask and movable to and from position between the upper and lower ramming devices, assembling mechanism comprising cylinders and plungers working therein, means for introducing fluid-pressure into said cylinders at the end of the ramming action to cause the plungers to lift the cope from the table, an exhaust for said cylinders opened as the plungers reach the upper limit of their movement, a valve operable by said exhaust, and means controlled by said valve for moving the table from position between the ramming devices.

17. In a molding-machine, the combination of upper and lower ramming devices, a table adapted to support the cope and drag sections of a flask and movable to and from position between the upper and lower ramming devices, air or other fluid operated assembling mechanism, means for introducing the air or other fluid thereto after the ramming action to cause the same to lift the cope-section from the table, an exhaust for the air or other fluid so introduced, and means set in operation by the exhaust for moving the table from position between the ramming devices, and hand-controlled means for thereafter lowering the cope upon the drag.

18. In a molding-machine, the combination of ramming devices, a table for supporting the cope and drag sections of the flask and movable to and from position between said ramming devices, assembling mechanism for lifting the cope from the table, means operable by movement of the ramming devices for controlling the lifting action of the assembling mechanism, and means operable by movement of the assembling mechanism for controlling the movement of the table.

19. In a molding-machine, the combination of upper and lower ramming devices, a table for supporting the cope and drag sections of the flask and movable to and from position between the ramming devices, cylinders and plungers for moving the table to and from said positions, assembling mechanism comprising cylinders and plungers, means controlled by movement of the ramming devices for introducing air or other fluid to the cylinders of the assembling mechanism, and means controlled by movement of the assembling mechanism for introducing air or other fluid pressure to the table-operating cylinders.

20. In a molding-machine, the combination of ramming devices, a table for supporting the cope and drag sections of the flask and movable to and from position between said ramming devices, assembling mechanism for lifting the cope from the table means operable by movement of the ramming devices for controlling the lifting action of the assembling mechanism, and means operable by movement of the assembling mechanism for controlling the movement of the table, and hand-controlled means for moving the assembling mechanism to place the cope upon the drag when the table has been moved from between the ramming devices.

21. In a molding-machine, a table for supporting the cope and drag sections of a flask, fluid-operated ramming devices for simultaneously ramming both of said sections, fluid-operated assembling mechanism for raising the cope-section from the table after the ramming operation, fluid-operated means for moving the table from between the ramming devices after the ramming operation, and a hand-operated valve for controlling the movement of the assembling mechanism in placing the cope upon the drag.

22. In a molding-machine, upper and lower ramming devices, a table for supporting the cope and drag sections of a flask, said table comprising on each face thereof a stripping-plate, a pattern-plate next adjacent each stripping-plate and within the table, means for moving the ramming devices in the ramming operation, and devices under control of the ramming devices for stripping or withdrawing the patterns from the flask-sections.

23. In a molding-machine, the combination of upper and lower fluid-operated ramming devices, a table for supporting the cope and drag sections of a flask, said table comprising on each face thereof a stripping-plate, a pattern-plate for each stripping-plate and arranged within the table next adjacent said plates, fluid-operated means for stripping or withdrawing the patterns from the flask-sections, the operation of said means being controlled by movement of the ramming devices.

24. In a molding-machine, a table for supporting the cope and drag sections of a flask, said table having on the upper and lower faces thereof a stripping-plate, a pattern-plate arranged within the table next adjacent each stripping-plate, yielding means for normally pressing the pattern-plates toward the stripping-plates, and locking trip-cams for locking the pattern-plates in position during the ramming operation.

25. In a molding-machine, a table for supporting the cope and drag sections of a flask, said table having on the upper and lower faces thereof a stripping-plate, a pattern-plate arranged within the table next adjacent each stripping-plate and locking trip-cams for locking the pattern-plates in position during the ramming operation, and means for automatically tripping said cams from their locking position when the patterns are to be withdrawn from the drag and cope sections of the flask.

26. In a molding-machine, a table for holding the cope and drag sections of a flask, said table having on its upper and lower faces a stationary stripping-plate, a movable pattern-plate arranged within the table for each stripping-plate, springs for normally pressing the pattern-plates toward the stripping-plates, a locking trip-cam for locking the pattern-plates in position for forming the mold, and means for tripping the cams and moving the pattern-plates inward of the table to withdraw the patterns from the flask-sections.

27. In a molding-machine, upper and lower fluid-operated ramming devices, a table for sustaining the cope and drag sections of the flask, said table comprising stripping-plates arranged one on each side of the table, a movable pattern-plate for each stripping-plate, and fluid-operated means under control of the ramming devices for withdrawing the patterns from the flask-sections.

28. A table for supporting the cope and drag sections of a flask, holding-arms for the drag-section pivotally mounted on said table, pins for engagement with the drag-section to lock the arms thereto, yielding means tending to turn the arms on their pivotal mountings to disengage the arms from the drag-section, the lower plunger head or plate and means carried thereby for unlocking the pins from the drag to permit the yielding means to disengage the arm from the drag.

29. A table for supporting the cope and drag sections of a flask, holding-arms for the drag-section pivotally mounted on said table, means for adjusting said arms to the size of drag to be carried, pins for engagement with the drag-section to lock the arms thereto, yielding means tending to turn the arms on their pivotal mountings to disengage the arms from the drag-section, the lower plunger head or plate and means carried thereby for unlocking the pins from the drag to permit the yielding means to disengage the arms from the drag.

30. A table for supporting the cope and drag sections of a flask, holding-arms for the drag-section pivotally mounted on said table, slides carried by said arms and provided with retaining-pins for engagement with slots formed in the drag, means normally acting to hold said pins in engagement with the slots, and devices for moving the pins against the action of said means to free the holding-arms from the drag.

31. In a molding-machine, the combination of ramming devices, means for operating the ramming devices by fluid-pressure, fluid-operated assembling devices, a table, fluid-operated means for moving the table to and from position for coöperation with the ramming devices, and fluid-operated stripping devices, the passage of operating fluid to the assembling and stripping devices being controlled by movement of the ramming devices.

32. In an automatic molding-machine, the combination of ramming devices operated by fluid-pressure, assembling devices operated by fluid-pressure, a table and means to move the table to and from position for coöperation with the ramming devices, said means being operated by fluid-pressure and stripping devices, and means controlled by the ramming devices for automatically operating the table by fluid-pressure.

In testimony whereof I have hereunto affixed my signature this 8th day of September, A. D. 1903.

FREDERICK W. HALL.

Witnesses:
A. FLORENCE YERGER,
A. M. BIDDLE.